US012785253B2

(12) United States Patent
Kim et al.

(10) Patent No.: US 12,785,253 B2
(45) Date of Patent: Nov. 3, 2026

(54) MOBILE COMMUNICATION DEVICE COMPRISING ANTENNA

(71) Applicant: Samsung Electronics Co., Ltd., Suwon-si (KR)

(72) Inventors: Yunsik Kim, Suwon-si (KR); Woosuk Kang, Suwon-si (KR); Mincheol Seo, Suwon-si (KR); Donghun Shin, Suwon-si (KR); Changha Yu, Suwon-si (KR); Minkyung Lee, Suwon-si (KR); Gyubok Park, Suwon-si (KR); Kiyong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 18/436,333

(22) Filed: Feb. 8, 2024

(65) Prior Publication Data

US 2024/0186681 A1 Jun. 6, 2024

Related U.S. Application Data

(63) Continuation of application No. PCT/KR2022/011369, filed on Aug. 2, 2022.

(30) Foreign Application Priority Data

Aug. 12, 2021 (KR) ........................ 10-2021-0106895

(51) Int. Cl.
*H01Q 1/24* (2006.01)
*H01Q 5/371* (2015.01)
(Continued)

(52) U.S. Cl.
CPC ............. *H01Q 1/243* (2013.01); *H01Q 5/371* (2015.01); *H01Q 13/10* (2013.01); *H04M 1/0202* (2013.01); *H04M 1/026* (2013.01)

(58) Field of Classification Search
CPC ........ H01Q 1/243; H01Q 5/314; H01Q 5/371; H01Q 13/10; H01Q 1/38; H01Q 1/46; H04M 1/0202; H04M 1/026
See application file for complete search history.

(56) References Cited

U.S. PATENT DOCUMENTS 8,854,267 B2 10/2014 Kim et al.
9,190,713 B2 11/2015 Eom et al.
(Continued)

FOREIGN PATENT DOCUMENTS

CN 105932408 B 9/2018
CN 112713384 A 4/2021
(Continued)

OTHER PUBLICATIONS

European Search Report dated Nov. 7, 2024, issued in European Application No. 22856089.2.
(Continued)

*Primary Examiner* — Dameon E Levi
*Assistant Examiner* — Yonchan J Kim
(74) *Attorney, Agent, or Firm* — Jefferson IP Law, LLP

(57) ABSTRACT

A mobile communication device is provided. The mobile communication device includes a housing having a first edge extending in a first direction and a second edge extending from one end of the first edge in a second direction perpendicular to the first direction, a wireless communication circuit, and a conductive member, wherein the housing includes a first conductive portion forming a part of the first edge and having a predetermined length, and a second conductive portion forming an inner frame of the mobile communication device, part of the second conductive portion is spaced apart from the first conductive portion, and includes an indentation formed to correspond to the protrusion of the first conductive portion, and the wireless com-
(Continued)

munication circuit supplies power to the protrusion to transmit/receive a wireless signal through the first conductive portion, the second conductive portion, or part of the conductive member.

16 Claims, 18 Drawing Sheets

(51) Int. Cl.

| | |
|---|---|
| ***H01Q 13/10*** | (2006.01) |
| ***H04M 1/02*** | (2006.01) |

(56) References Cited

U.S. PATENT DOCUMENTS

| | | | |
|---|---|---|---|
| 9,673,512 B2 | 6/2017 | Lin | |
| 9,972,891 B2 | 5/2018 | Ayala Vazquez et al. | |
| 10,056,696 B2 | 8/2018 | Tseng et al. | |
| 10,199,716 B2 | 2/2019 | Cai et al. | |
| 10,707,558 B2 | 7/2020 | Hu et al. | |
| 11,056,769 B2 | 7/2021 | Jeon et al. | |
| 2007/0115183 A1 | 5/2007 | Kim et al. | |
| 2009/0009400 A1 | 1/2009 | Kim et al. | |
| 2016/0088130 A1* | 3/2016 | Jung | G06F 1/1626 455/575.1 |
| 2018/0115053 A1* | 4/2018 | Hu | H01Q 1/243 |
| 2019/0181564 A1* | 6/2019 | Kwon | H01Q 1/16 |
| 2020/0052377 A1 | 2/2020 | Zhou et al. | |
| 2020/0076056 A1* | 3/2020 | Froese | H04M 1/0283 |
| 2020/0144699 A1* | 5/2020 | Jeon | H01Q 9/36 |
| 2020/0194879 A1 | 6/2020 | Lim et al. | |
| 2021/0151856 A1 | 5/2021 | Kim et al. | |
| 2021/0234950 A1 | 7/2021 | Hong | |
| 2022/0094046 A1* | 3/2022 | Compton | H01Q 9/42 |
| 2022/0103668 A1 | 3/2022 | Kim et al. | |

FOREIGN PATENT DOCUMENTS

| | | |
|---|---|---|
| KR | 10-2007-0054977 A | 5/2007 |
| KR | 10-2009-0003706 A | 1/2009 |
| KR | 10-2010-0026784 A | 3/2010 |
| KR | 10-2010-0096380 A | 9/2010 |
| KR | 10-2020-0017541 A | 2/2020 |
| KR | 10-2020-0026000 A | 3/2020 |
| KR | 10-2020-0051399 A | 5/2020 |
| KR | 10-2020-0073745 A | 6/2020 |
| KR | 10-2020-0098857 A | 8/2020 |
| KR | 10-2021-0031303 A | 3/2021 |

OTHER PUBLICATIONS

International Search Report dated Nov. 25, 2022, Issued in International Application No. PCT/KR2022/011369.

Korean Office Action dated Sep. 25, 2025, issued in Korean Application No. 10-2021-0106895.

Korean Notice of Patent Grant dated Apr. 13, 2026, issued in Korean Application No. 10-2021-0106895.

* cited by examiner

MOBILE COMMUNICATION DEVICE COMPRISING ANTENNA

CROSS-REFERENCE TO RELATED APPLICATION(S)

This application is a continuation application, claiming priority under § 365(c), of an International application No. PCT/KR2022/011369, filed on Aug. 2, 2022, which is based on and claims the benefit of a Korean patent application number 10-2021-0106895, filed on Aug. 12, 2021, in the Korean Intellectual Property Office, the disclosure of which is incorporated by reference herein in its entirety.

BACKGROUND

1. Field

The disclosure relates to a mobile communication device including an antenna.

2. Description of Related Art

Recently released mobile communication devices may include antennas to provide various wireless communications for various services.

A part of a housing forming an exterior of a mobile communication device may be formed with a metal frame, and the metal frame may receive fed power and may operate as an antenna radiator. In addition, a conductive material formed inside a mobile communication device may be used as an antenna radiator in a designated frequency band.

Meanwhile, when an opening is formed in a certain area of a mobile communication device, power may be fed to a metallic portion adjacent to the opening, allowing the opening to operate as a slot antenna.

The above information is presented as background information only to assist with an understanding of the disclosure. No determination has been made, and no assertion is made, as to whether any of the above might be applicable as prior art with regard to the disclosure.

SUMMARY

When an antenna radiator should have a long electrical length to perform wireless communication in a designated frequency band, there may be difficulty in increasing the electrical length of the antenna radiator due to a small mounting space of a mobile communication device.

In order to implement an antenna radiator by using a metal frame, a segmented portion should be formed in a certain area of the metal frame. However, stiffness of the metal frame may be reduced due to the segmented portion.

Aspects of the disclosure are to address at least the above-mentioned problems and/or disadvantages and to provide at least the advantages described below. Accordingly, an aspect of the disclosure is to provide a structure for increasing an electrical length of an antenna in a mobile communication device which includes an antenna using at least part of a metal frame as an antenna radiator.

Additional aspects will be set forth in part in the description which follows and, in part, will be apparent from the description, or may be learned by practice of the presented embodiments.

In accordance with an aspect of the disclosure, a mobile communication device is provided. The mobile communication device includes a housing which includes a first periphery of the mobile communication device which is extended along a first direction, and a second periphery which is extended from one end of the first periphery in a second direction which is perpendicular to the first direction, a wireless communication circuit which is disposed in the housing, and a conductive member which forms a part of the housing or is disposed inside the housing, wherein the housing includes a first conductive portion which forms a part of the first periphery and has a designated length, and a second conductive portion which forms an inner frame of the mobile communication device, wherein the first conductive portion includes a protrusion extended from a first point of the first periphery, a first portion extended from the first point by a first length along the first direction, and a second portion extended from the first point by a second length which is longer than the first length in the opposite direction of the first direction, wherein at least part of the second conductive portion is spaced apart from the first conductive portion in the second direction and is formed in parallel with the first conductive portion, and includes an indentation which is formed to correspond to the protrusion of the first conductive portion, wherein the conductive member is disposed among the second portion of the first conductive portion, the second conductive portion, and the protrusion, and wherein the wireless communication circuit feeds power to the protrusion to transmit and receive a wireless signal through at least part of the first conductive portion, the second conductive portion, or the conductive member.

In accordance with another aspect of the disclosure, an electronic device is provided. The electronic device includes a housing which includes a first periphery of the electronic device which is extended along a first direction, and a second periphery which is extended from one end of the first periphery in a second direction which is perpendicular to the first direction, a wireless communication circuit which is disposed in the housing, and a conductive member which forms a part of the housing or is disposed inside the housing, wherein the housing includes a first conductive portion which forms a part of the first periphery and has a designated length, and a second conductive portion which forms an inner frame of the electronic device, wherein the first conductive portion includes a first portion extended from a first point of the first conductive portion by a first length along the first direction, and a second portion extended from the first point by a second length which is longer than the first length in the opposite direction of the first direction, wherein at least part of the second conductive portion is spaced apart from the first conductive portion in the second direction and is formed in parallel with the first conductive portion, wherein the conductive member is disposed between the second portion of the first conductive portion, and the second conductive portion, wherein the wireless communication circuit feeds power to a certain point of the first conductive portion to transmit and receive a wireless signal through at least part of the first conductive portion, the second conductive portion, or the conductive member.

According to various embodiments of the disclosure, an electrical length of an antenna which is used as a radiator in a mobile communication device including an antenna may be increased, and furthermore, a segmented portion may be reduced, so that stiffness of the mobile communication device is guaranteed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1A:
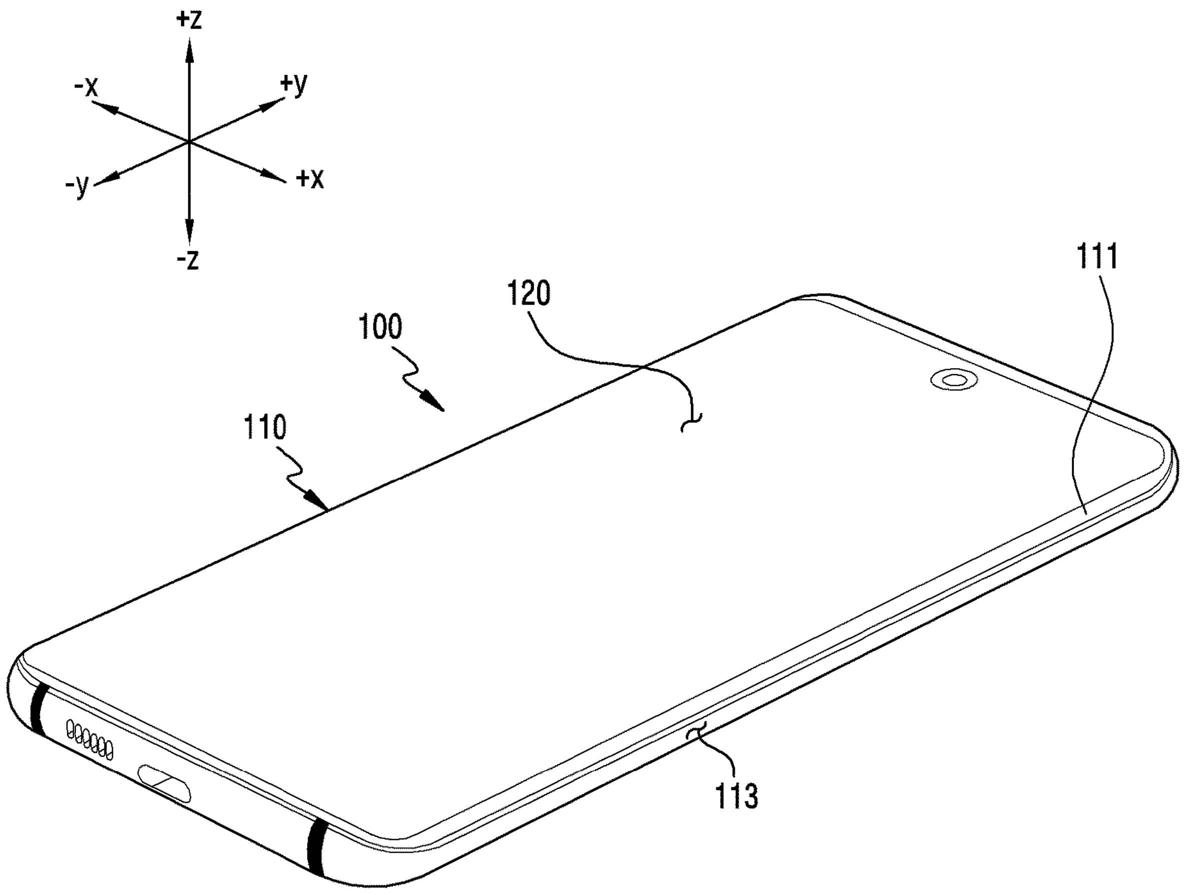
FIG. 1A is a perspective view of a front surface of a mobile communication device according to an embodiment of the disclosure.
Figure 1B:
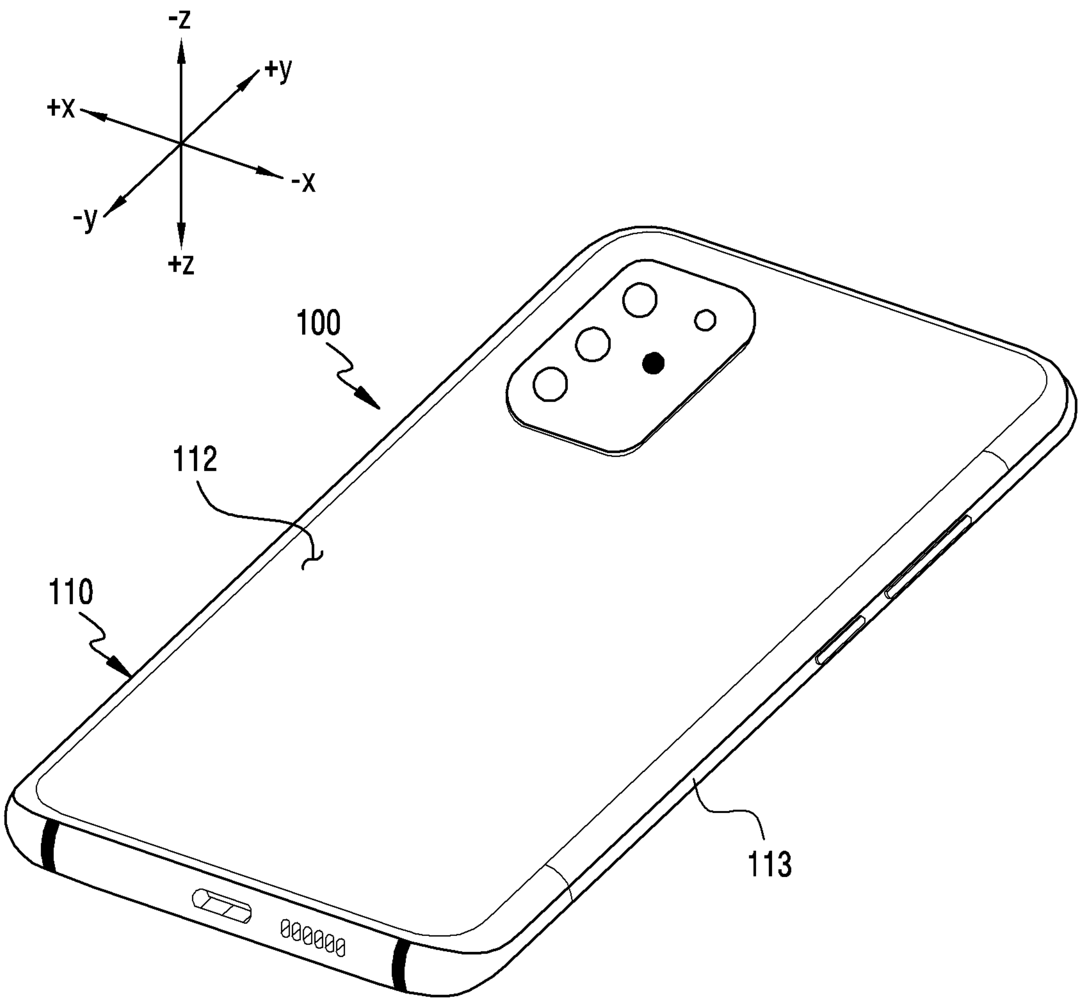
FIG. 1B is a perspective view of a rear surface of the mobile communication device according to an embodiment of the disclosure.

FIG. 1A is a perspective view of a front surface of a mobile communication device 100 (for example, a surface positioned in a +z direction of the mobile communication device 100 of FIG. 1A) according to an embodiment of the disclosure. FIG. 1B is a perspective view of a rear surface of the mobile communication device 100 (for example, a surface positioned in a −z direction of the mobile communication device of FIG. 1B) according to an embodiment of the disclosure.

Referring to FIGS. 1A and 1B, the mobile communication device 100 may include a housing 110 which includes a front surface plate 111, a rear surface plate 112, and a side surface member 113 surrounding a space between the front surface plate 111 and the rear surface plate 112.

In an embodiment, the display 120 may be disposed to form at least part of the front surface plate 111 of the housing 110 or to be visible through the front surface plate 111. In an example, the display 120 may occupy most of the front surface of the mobile communication device 100 (for example, a surface positioned in the +z direction of the mobile communication device 100 of FIG. 1A).

According to an embodiment, the rear surface plate 112 may be formed by coated or colored glass, ceramic, a polymer, metal (for example, aluminum, stainless steel (STS), or magnesium), or a combination of at least two of the above-mentioned materials. According to an embodiment, the rear surface plate 112 may include a curved portion that is bent from an end of at least one side toward the side surface member 113 and is seamlessly extended.

According to an embodiment, the side surface member 113 may be coupled with the rear surface plate 112, and may include metal and/or polymer. According to an embodiment, the rear surface plate 112 and the side surface member 113 may be integrally formed with each other and may include the same material (for example, a metallic material such as aluminum).

According to an embodiment, a conductive portion of the side surface member 113 may be electrically connected with a wireless communication circuit, and may operate as an antenna radiator to transmit and/or receive a radio frequency (RF) signal of a designated frequency band. According to an embodiment, the wireless communication circuit may transmit a RF signal of a designated frequency band to the conductive portion of the side surface member 113, or may receive a RF signal of a designated frequency band from the conductive portion.

The mobile communication device 100 illustrated in FIGS. 1A and 1B is merely one example and does not limit types of devices to which the technical concept of the disclosure is applied. The technical concept of the disclosure may be applied to various user devices including a part operating as an antenna radiator. For example, the technical concept of the disclosure may be applied to a foldable mobile communication device that employees a flexible display and a hinge structure and is foldable in the horizontal direction or vertical direction, or a tablet or a laptop.

Hereinafter, various embodiments will be described with reference to the mobile communication device 100 illustrated in FIGS. 1A and 1B for convenience of explanation.

Figure 2:
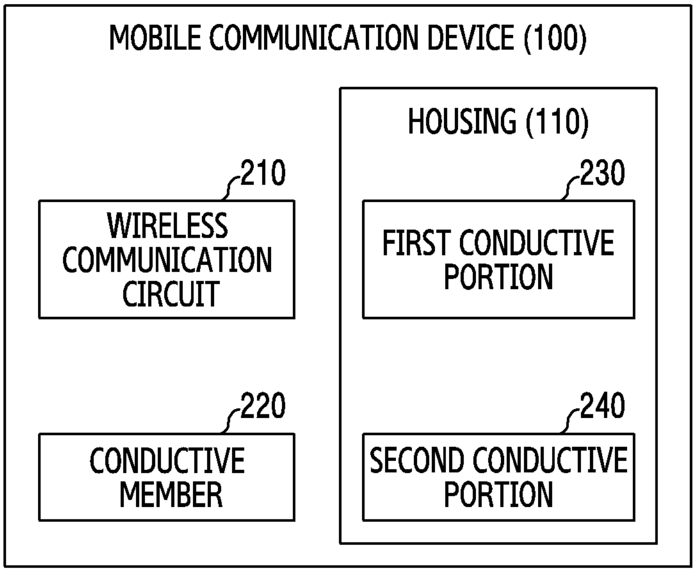
FIG. 2 is a view illustrating a hardware configuration of the mobile communication device according to an embodiment of the disclosure.

FIG. 2 illustrates a hardware configuration of the mobile communication device 100 according to an embodiment of the disclosure.

Referring to FIG. 2, the mobile communication device 100 may include a housing 110, a wireless communication circuit 210, or a conductive member (or a first conductive member) 220, and the housing 110 may include a first conductive portion 230 or a second conductive portion 240.

According to an embodiment, the wireless communication circuit 210 may be disposed on a printed circuit board. In an example, the wireless communication circuit 210 may transmit a RF signal to an electronic component electrically connected with a printed circuit board or may receive a RF signal from the electronic component.

According to an embodiment, the conductive member 220 may form a part of the housing 110 or may be disposed inside the housing 110. In an example, the conductive member 220 may be extended from the side surface member 113 forming a side surface of the housing 110. In another example, the conductive member 220 may be spaced apart from the side surface member 113 forming a side surface of the housing 110, and may be disposed inside the mobile communication device 100.

According to an embodiment, the mobile communication device 100 may further include other components in addition to the housing 110, the wireless communication circuit 210, or the conductive member 220. For example, the mobile communication device 100 may further include a printed circuit board (PCB) on which the wireless communication circuit 210 is disposed. In another example, the mobile communication device 100 may further include a support member to support an electronic component such as a printed circuit board.

According to an embodiment, the first conductive portion 230 included in the housing 110 may be at least part of the side surface member 113. In an example, the first conductive portion 230 may refer to a certain area of the side surface member 113 forming a side surface of the mobile communication device 100.

According to an embodiment, the second conductive portion 240 included in the housing 110 may be a part of the support member. In an example, the second conductive portion 240 may refer to a certain area of the support member supporting electronic components included in the mobile communication device 100.

Figure 3:
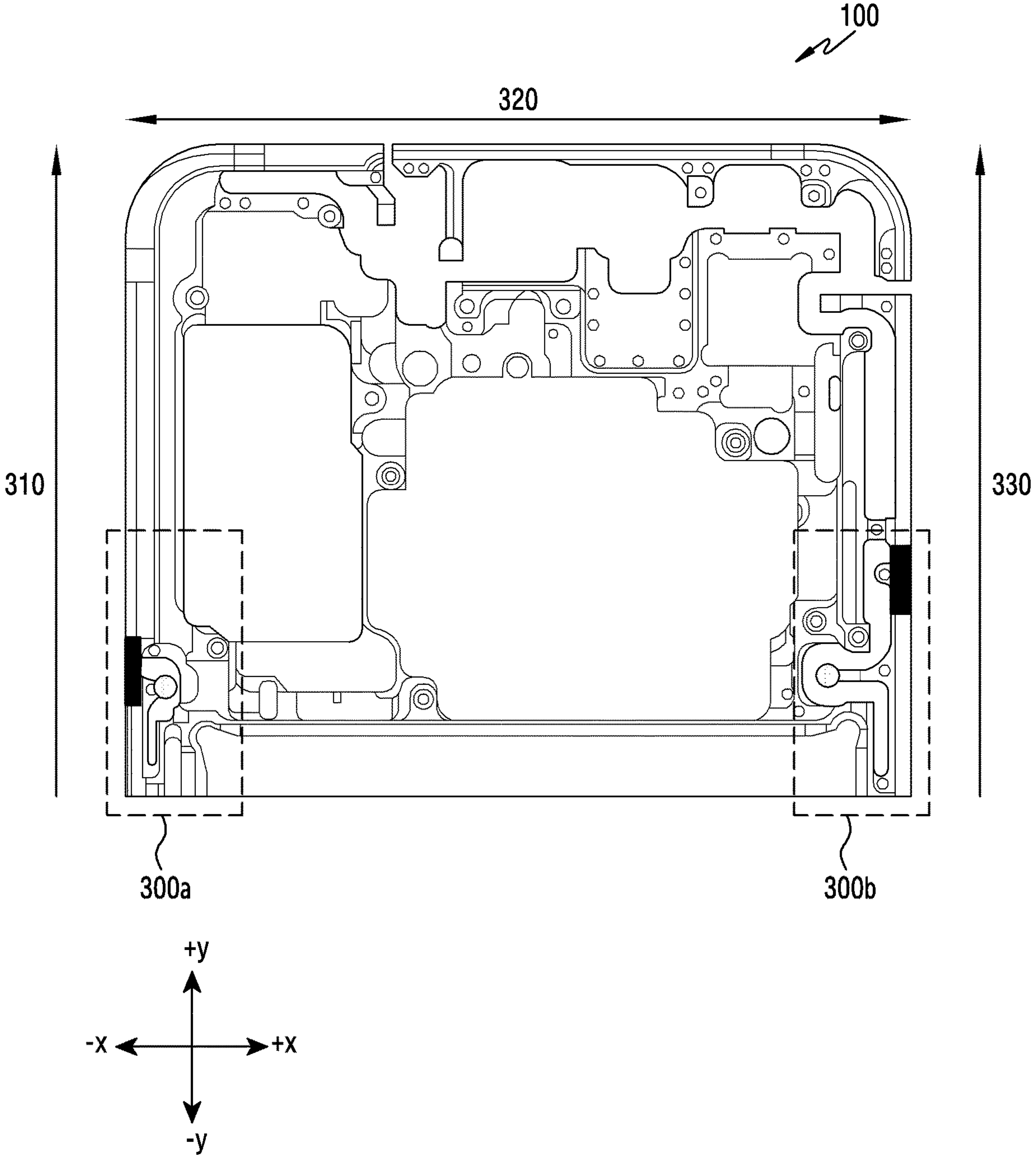
FIG. 3 is a view illustrating one surface of the mobile communication device according to an embodiment of the disclosure.

FIG. 3 illustrates one surface of the mobile communication device 100 according to an embodiment of the disclosure.

Referring to FIG. 3, the mobile communication device 100 may include a first periphery 310 which is extended along a first direction, and a second periphery 320 which is extended form one end of the first periphery in a second direction (for example, an x-axis direction of FIG. 3) which is substantially perpendicular to the first direction (for example, a y-axis direction of FIG. 3).

According to an embodiment, a certain area 300*a* of the mobile communication device 100, which will be described below with reference to FIG. 4, may be formed adjacent to the first periphery 310.

According to an embodiment, explanations of the certain area 300*a* of the mobile communication device 100, which will be described below with reference to FIG. 4, may be equally applied to another area 300*b* of the mobile communication device 100 that is formed adjacent to a third periphery 330 which is substantially parallel to the first periphery 310 and is perpendicular to the second periphery 320.

Figure 4:
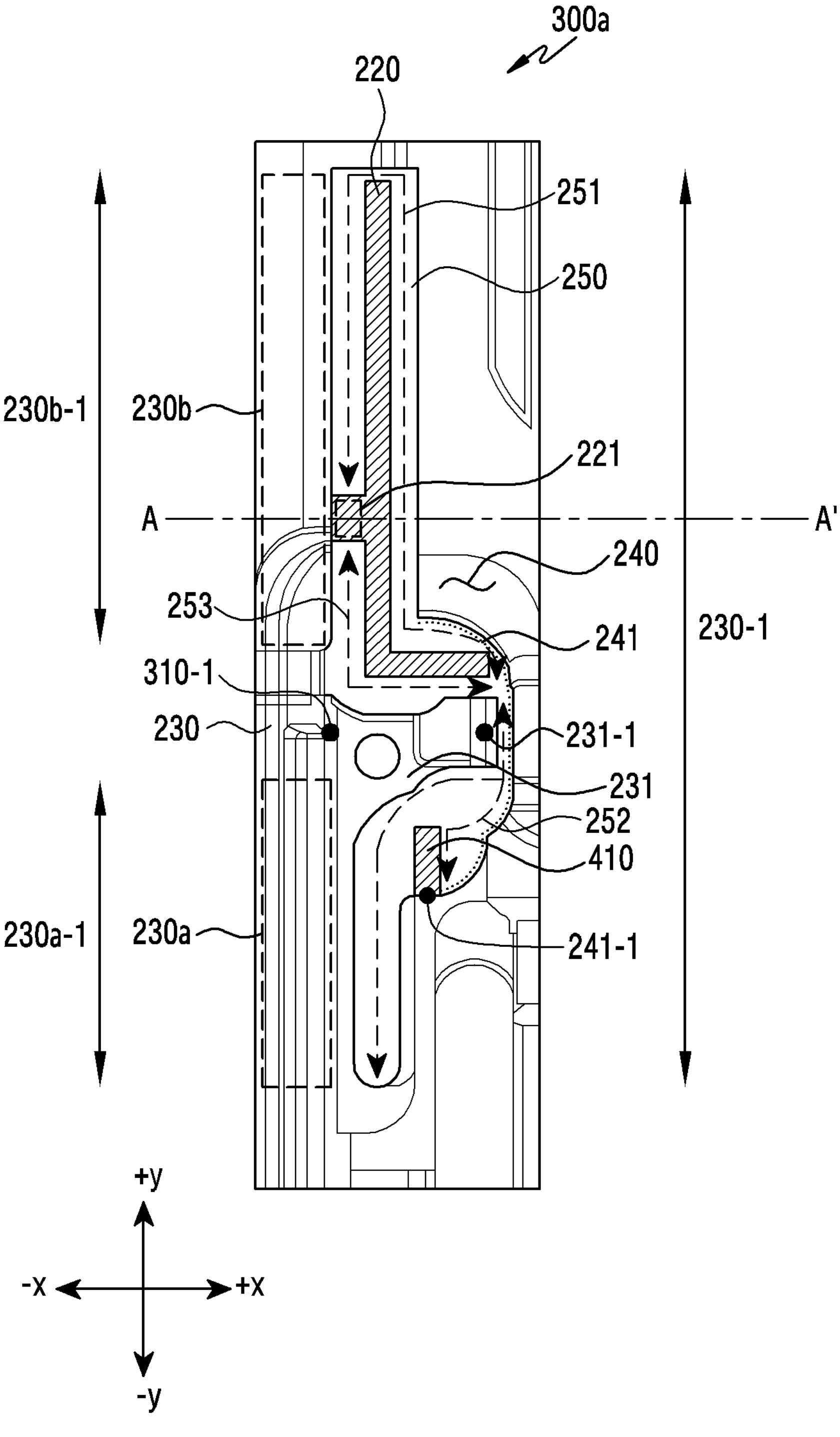
FIG. 4 is a view illustrating a certain area of the mobile communication device in which a conductive material is formed according to an embodiment of the disclosure.

FIG. 4 illustrates the certain area 300*a* of the mobile communication device 100 in which the conductive member 220 is formed according to an embodiment of the disclosure.

Referring to FIG. 4, the conductive member 220, the first conductive portion 230, or the second conductive portion 240 may be formed in the certain area 300*a* of the mobile communication device 100.

According to an embodiment, the conductive member 220 may form a part of the housing 110 or may be disposed inside the housing 110. In an example, the conductive member 220 may be integrally formed with the first conductive portion 230, thereby forming a part of the housing 110. In another example, the conductive member 220 may be spaced apart from the first conductive portion 230 by a designated distance, thereby being disposed inside the housing 110.

According to an embodiment, the conductive member 220 may include a connection portion 221. In an example, the connection portion 221 may be integrally formed with the first conductive portion 230, such that the first conductive portion 230 and the conductive member 220 are integrally formed with each other. In another example, the connection portion 221 may not be integrally formed with the first conductive portion 230 and is in contact with the first conductive portion 230, such that the first conductive portion 230 and the conductive member 220 are electrically connected with each other.

According to another embodiment, the conductive member 220 may not include the connection portion 221. In an example, the conductive member 220 may not include the connection portion 221, such that the conductive member 220 is spaced apart from the first conductive portion 230 by a designated distance.

According to an embodiment, a slot (or an opening) 250 may be formed on a periphery of the conductive member 220. The slot 250 may be filled with a nonconductive material, for example. In an example, the nonconductive material filling the slot 250 may be a dielectric that has a designated permittivity.

According to an embodiment, the first conductive portion 230 may form a part of the first periphery 310 and may have a length of a first range 230-1. In an example, the length of the first range 230-1 may be a length of a range from about 20 mm to about 21 mm. However, the length of the first range 230-1 may not be limited to the above-described length. In another example, the length of the first range 230-1 may be changed according to a mechanical change of the mobile communication device 100 or a frequency band of a resonance formed in the first conductive portion 230.

According to an embodiment, the first conductive portion 230 may include a protrusion 231 that is extended from a first point 310-1 of the first periphery 310.

According to an embodiment, the first conductive portion 230 may include a first portion 230*a* that is extended from the first point 310-1 by a first length 230*a*-1 along a first direction (for example, a −y axis direction of FIG. 4).

According to an embodiment, the first conductive portion 230 may include a second portion 230*b* that is extended from the first point 310-1 by a second length 230*b*-1 along the opposite direction (for example, a +y axis direction of FIG. 4) of the first direction. In an example, the second length 230*b*-1 may be longer than the first length 230*a*-1. In an example, the first length 230*a*-1 or the second length 230*b*-1 may be determined based on a designated frequency.

According to an embodiment, a segmented portion may not be formed in the first conductive portion 230.

According to an embodiment, the second conductive portion 240 may form an inner frame of the mobile communication device 100.

According to an embodiment, at least part of the second conductive portion 240 may be spaced apart from the first conductive portion 230 in a second direction (for example, a +x axis direction of FIG. 4) at least in part, and may be formed in parallel with the first conductive portion 230.

According to an embodiment, at least part of the second conductive portion 240 may include an indentation 241 that is formed to correspond to the protrusion 231.

According to an embodiment, the conductive member 220 may be disposed among the second portion 230*b*, the second conductive portion 240, and the protrusion 231.

According to an embodiment, a second conductive member 410 may be extended from a second point 241-1 of the indentation 241 toward the protrusion 231 in the +y axis direction, and may be formed in parallel with the first portion 230*a*. In an example, the second conductive member 410 may be integrally formed with the second conductive portion 240. In another example, the second conductive member 410 may be formed separately from the second conductive portion 240, and may be attached to the second point 241-1 of the indentation 241.

According to an embodiment, the second conductive member 410 may be a configuration for achieving substantially the same effect as that of the first conductive member (or the conductive member) 220. In an example, the second conductive member 410 and the first conductive member 220 may be formed with a conductive material such as metal.

According to an embodiment, the wireless communication circuit 210 may feed power to the protrusion 231, thereby transmitting and receiving wireless signals through at least part of the first conductive portion 230, the second conductive portion 240, or the conductive member 220. In an example, the wireless communication circuit 210 may feed power to a feeding point 231-1 of the protrusion 231.

According to an embodiment, the wireless communication circuit 210 may feed power to the slot 250 by feeding power to a certain point of the protrusion 231. In an example, the slot 250 may be fed with power by the wireless communication circuit 210, thereby operating as an antenna radiator (for example, a slot antenna).

According to an embodiment, the slot 250 may have a plurality of slot paths which operate as an antenna radiator by using the first conductive member 220 or the second conductive member 410, and accordingly, the slot 250 may function as a multi-band antenna. In an example, a first slot path 251 formed by the slot 250 may have a path of a first length, such that a resonance is formed in a low frequency band due to an electrical path formed along the periphery of the first slot path 251. In another example, a second slot path 252 formed by the slot 250 may have a path of a second length which is shorter than the first length, such that a resonance is formed in an intermediate frequency band due to an electrical path formed along the periphery of the second slot path 252. In still another example, a third slot path 253 formed by the slot 250 may have a path of a third length which is shorter than the second length, such that a resonance is formed in a high frequency band due to an electrical path formed along the periphery of the third slot path 253. The third slot path 253 may have a fork to divide into two or more parts.

According to an embodiment, the certain area 300*a* of the mobile communication device 100 may be understood as a kind of antenna structure. In an example, the wireless communication circuit 210 may feed power to the feeding point 231-1, such that the certain area 300*a* of the mobile communication device 100 operates as an antenna radiator.

Figure 5:
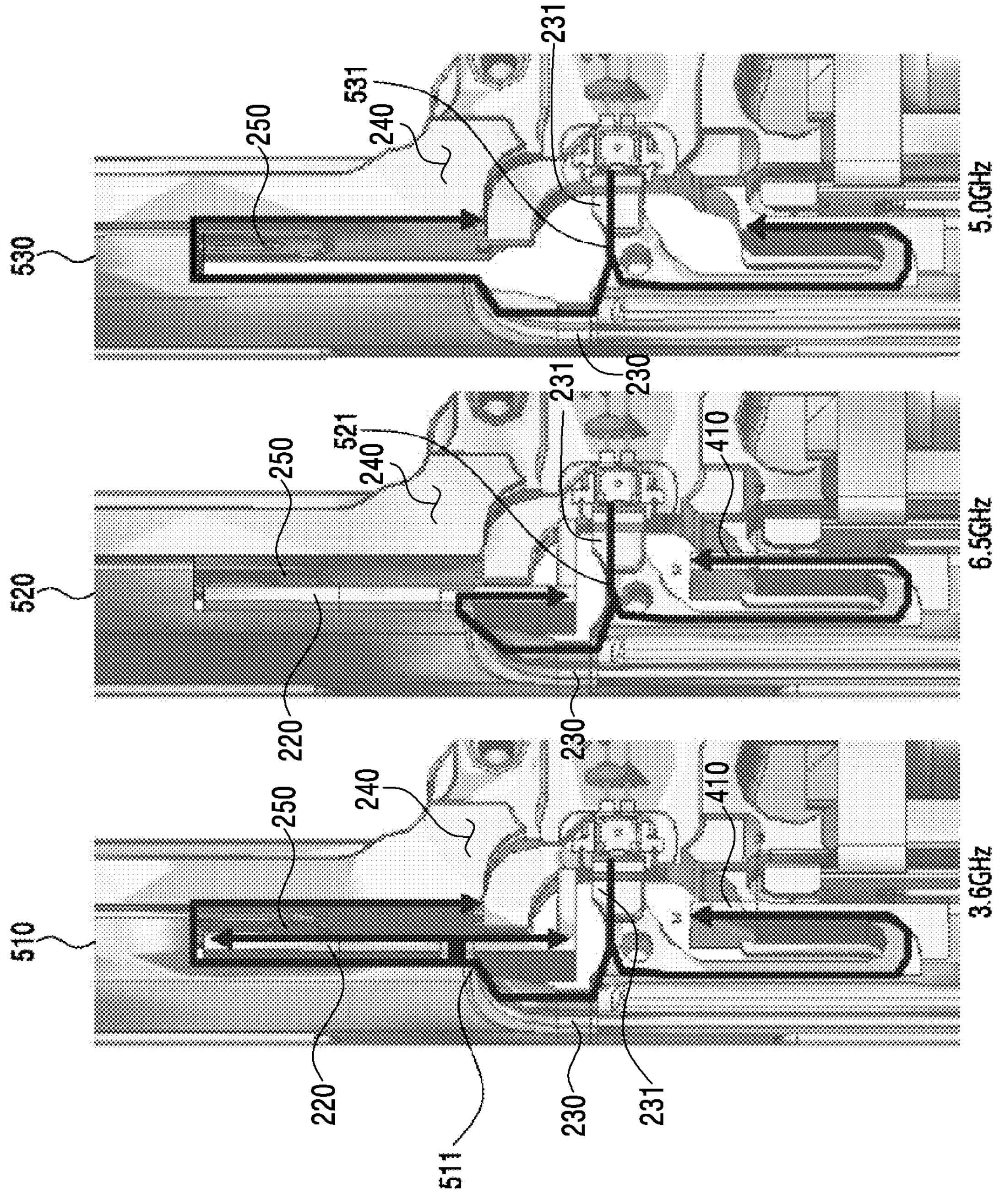
FIG. 5 is a view illustrating a resonance path which is formed in certain areas of the mobile communication device according to an embodiment of the disclosure.

FIG. 5 illustrates a resonance path which is formed in certain areas 510, 520, 530 of the mobile communication device 100 according to an embodiment of the disclosure.

Referring to FIG. 5, a resonance path may be formed in certain areas 510, 520, 530 of the mobile communication device 100. In an example, the certain area 510 of the mobile communication device 100 and the certain area 520 of the mobile communication device 100 may be understood as substantially the same area as the certain area 300*a* of the mobile communication device 100 shown in FIG. 4. In another example, the certain area 530 of the mobile communication device 100 may be understood as the certain area 300*a* of the mobile communication device 100 of FIG. 4 from which the conductive member 220 and the second conductive member 410 are removed.

According to an embodiment, when a first resonance path 511 is formed in the certain area 510 of the mobile communication device 100, the wireless communication circuit 210 may transmit and receive wireless signals in a frequency band of about 3.6 gigahertz (GHz) by using an antenna structure corresponding to the certain area 510 of the mobile communication device 100.

According to an embodiment, when a second resonance path 521 is formed in the certain area 520 of the mobile communication device 100, the wireless communication circuit 210 may transmit and receive wireless signals in a frequency band of about 6.5 GHz by using an antenna structure corresponding to the certain area 520 of the mobile communication device 100.

According to an embodiment, when a third resonance path 531 is formed in the certain area 530 of the mobile communication device 100, the wireless communication circuit 210 may transmit and receive wireless signals in a frequency band of about 5.0 GHz by using an antenna structure corresponding to the certain area 530 of the mobile communication device 100.

According to an embodiment, as an electrical length of a resonance path formed in the certain areas 510, 520, 530 of the mobile communication device 100 is longer, a frequency band of wireless communication performed through an antenna structure corresponding to the certain areas 510, 520, 530 of the mobile communication device 100 may be lower. For example, wireless communication through the first resonance path 511 may be performed in a lower frequency band than wireless communication through the second resonance path 521 which has a shorter electrical length than the first resonance path 511.

According to an embodiment, when the conductive member 220 and the second conductive member 410 are formed in the certain area 300*a* of the mobile communication device 100 (for example, the certain area 510 of the mobile communication device 100 of FIG. 5), wireless signals may be transmitted and received in a lower frequency band than when the conductive member 220 and the second conductive member 410 are not formed in the certain area 300*a* of the mobile communication device 100 (for example, the certain area 530 of the mobile communication device 100 of FIG. 5). In an example, when the conductive member 220 and the second conductive member 410 are formed in the certain area 300*a* of the mobile communication device 100, a resonance frequency at which wireless communication is performed may be lower than when the conductive member 220 and the second conductive member 410 are not formed in the certain area 300*a*. In another example, even when only the conductive member 220 is formed in the certain area 300*a* of the mobile communication device 100, a resonance frequency at which wireless communication is performed may be lower than when the conductive member 220 is not formed in the certain area 300*a*.

Figure 6:
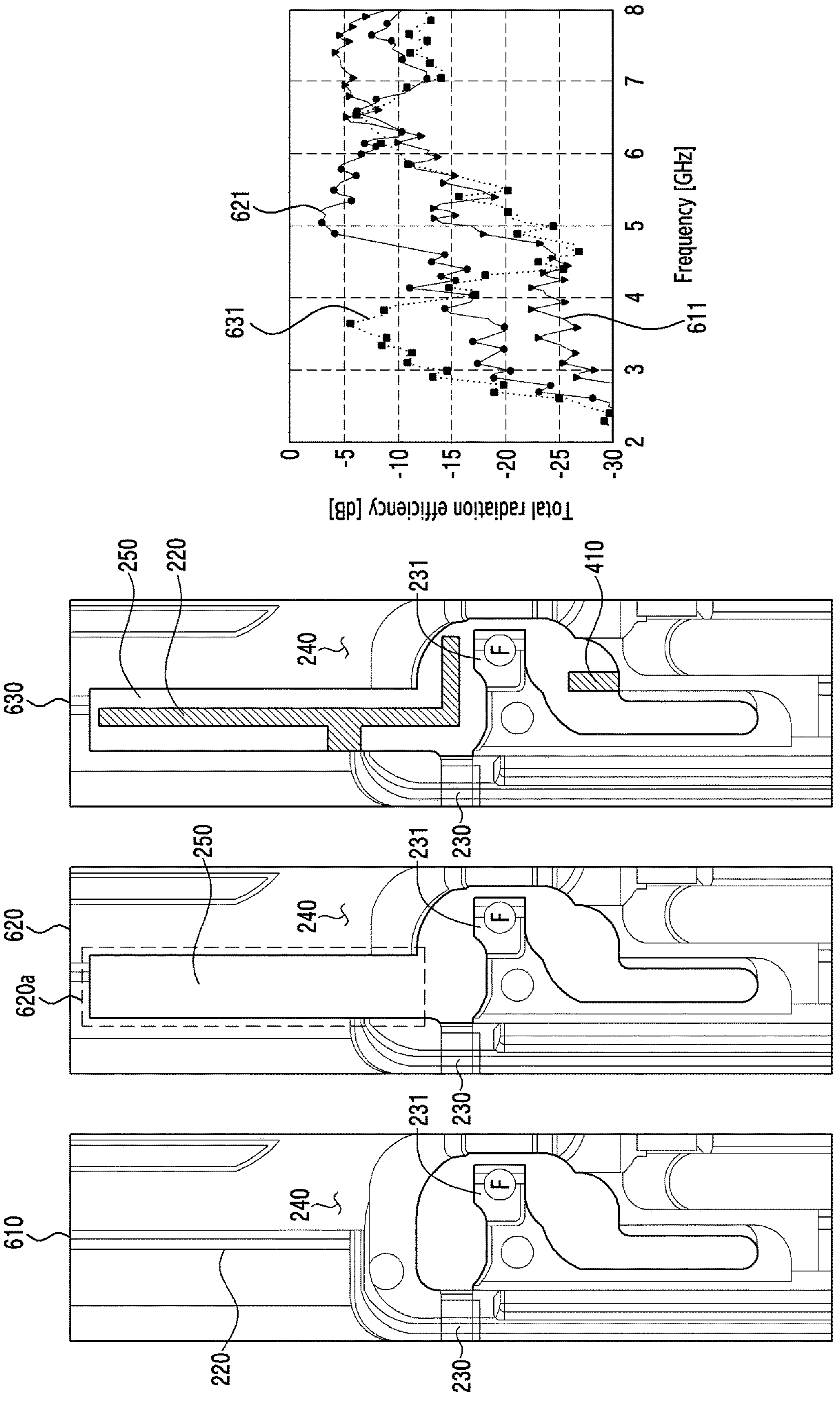
FIG. 6 is a view illustrating a graph of total radiation efficiency achieved by a resonance formed by antenna structures according to an embodiment of the disclosure.

FIG. 6 illustrates a graph showing total radiation efficiency achieved by a resonance formed in antenna structures 610, 620, 630 according to an embodiment of the disclosure.

Referring to FIG. 6, when wireless communication is performed by antenna structures 610, 620, 630, total radiation efficiency may vary according to a frequency band. In an example, the antenna structure 630 may be understood as a configuration corresponding to the certain area 300*a* of the mobile communication device 100 shown in FIG. 3. In another example, the antenna structure 610 and the antenna structure 620 may be understood as a configuration different from the certain area 300*a* of the mobile communication device 100 shown in FIG. 3.

According to an embodiment, when the wireless communication circuit feeds power to a certain point of the antenna structure 610, wireless communication performed by the mobile communication device 100 through the antenna structure 610 may have total radiation efficiency as indicated by a first graph 611.

According to an embodiment, when the wireless communication circuit feeds power to a certain point of the antenna structure 620, wireless communication performed by the mobile communication device 100 through the antenna structure 620 may have total radiation efficiency as indicated by a second graph 621.

According to an embodiment, when the wireless communication circuit feeds power to a certain point of the antenna structure 630, wireless communication performed by the mobile communication device 100 through the antenna structure 610 may have total radiation efficiency as indicated by a third graph 631.

According to an embodiment, the antenna structure 620 may additionally include a first nonconductive portion 620*a*, compared to the antenna structure 610, and accordingly, a value of total radiation efficiency of the mobile communication device 100 may change. In an example, when the antenna structure 620 is formed in the mobile communication device 100, the mobile communication device 100 may have higher total radiation efficiency in a frequency band of about 2 GHz to about 6 GHz than when the antenna structure 610 is formed in the mobile communication device 100.

According to an embodiment, the antenna structure 630 may additionally include the conductive member 220 and the second conductive member 410, compared to the antenna structure 620, and accordingly, a frequency band in which the total radiation efficiency of the mobile communication device 100 reaches a maximum may change. In an example, when the antenna structure 630 is formed in the mobile communication device 100, a frequency band in which total radiation efficiency reaches a maximum may be lower than when the antenna structure 620 is formed in the mobile communication device 100. For example, when the mobile communication device 100 incudes the antenna structure 620, total radiation efficiency may reach a maximum in a frequency band of about 5 GHZ, and, when the mobile communication device 100 incudes the antenna structure 630, total radiation efficiency may reach a maximum in a frequency band of about 3.5 GHz to about 4 GHZ.

Figure 7:
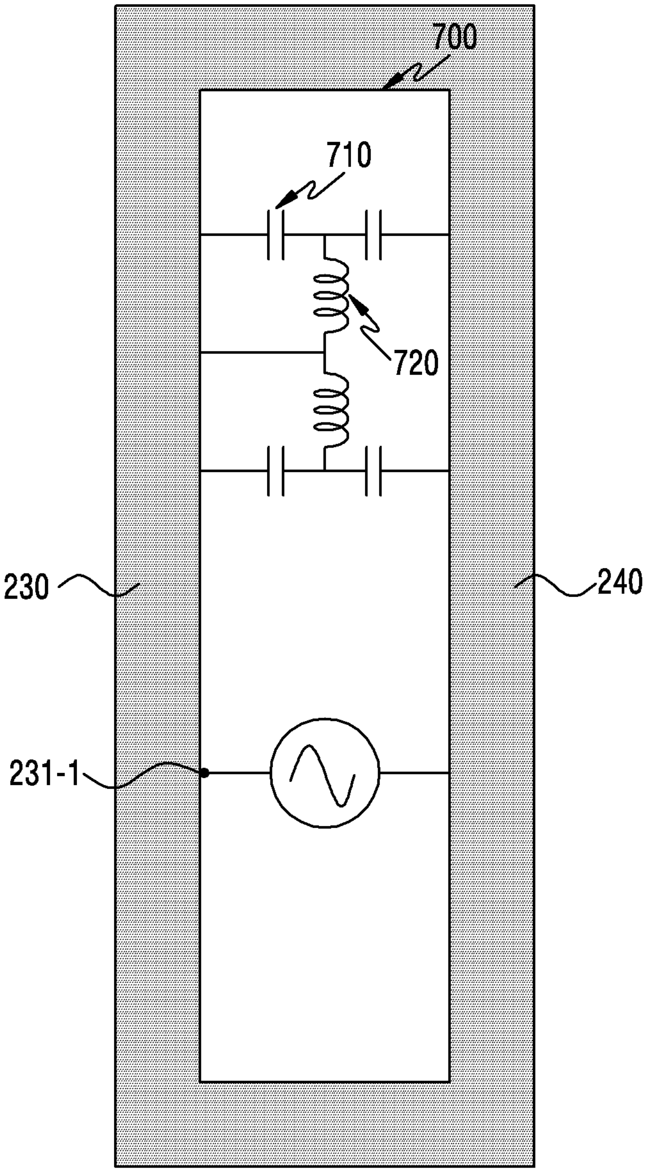
FIG. 7 is a view illustrating an equivalent circuit of a certain area of the mobile communication device according to an embodiment of the disclosure.

FIG. 7 illustrates an equivalent circuit 700 of the certain area 300*a* of the mobile communication device 100 according to an embodiment of the disclosure.

Referring to FIG. 7, the equivalent circuit 700 of the certain area 300*a* of the mobile communication device 100 may include a plurality of capacitors 710, a plurality of inductors 720, or at least one feeding point 231-1. In an example, a capacitance value of the plurality of capacitors 710 may be determined by a permittivity of a dielectric filling the slot 250. In addition, an inductance value of the plurality of inductors 720 may be determined by an electrical length of the conductive member 220. For example, the plurality of capacitors 710 may be an expression of a capacitance formed on the slot facing the first conductive portion 230 and the second conductive portion 240 with reference to the conductive member 220 and the connection portion 221, and the plurality of inductors 720 may be an expression of an inductance component appearing on a length component of the conductive member 220 which branches into both surfaces with reference to the connection portion 221.

According to an embodiment, the equivalent circuit 700 of the certain area 300*a* of the mobile communication device 100 may be disposed between the first conductive portion 230 and the second conductive portion 240.

According to an embodiment, the equivalent circuit 700 of the certain area 300*a* of the mobile communication device 100 includes the plurality of inductors 720, such that an electrical length of a resonance path formed in the certain area 300*a* of the mobile communication device 100 increases. In an example, the resonance path formed in the certain area 300*a* of the mobile communication device 100 includes at least part of the plurality of inductors 720, and accordingly may have a longer electrical length than when there is no plurality of inductors 720.

According to an embodiment, the wireless communication circuit 210 may feed power to the feeding point 231-1 in the certain area 300*a* of the mobile communication device 100, thereby transmitting and receiving wireless signals through at least part of the first conductive portion 230, the second conductive portion 240, or the plurality of inductors 720. In an example, a current fed through the feeding point 231-1 may pass through the first conductive portion 230 and may flow to at least part of the plurality of inductors 720.

Figure 8:
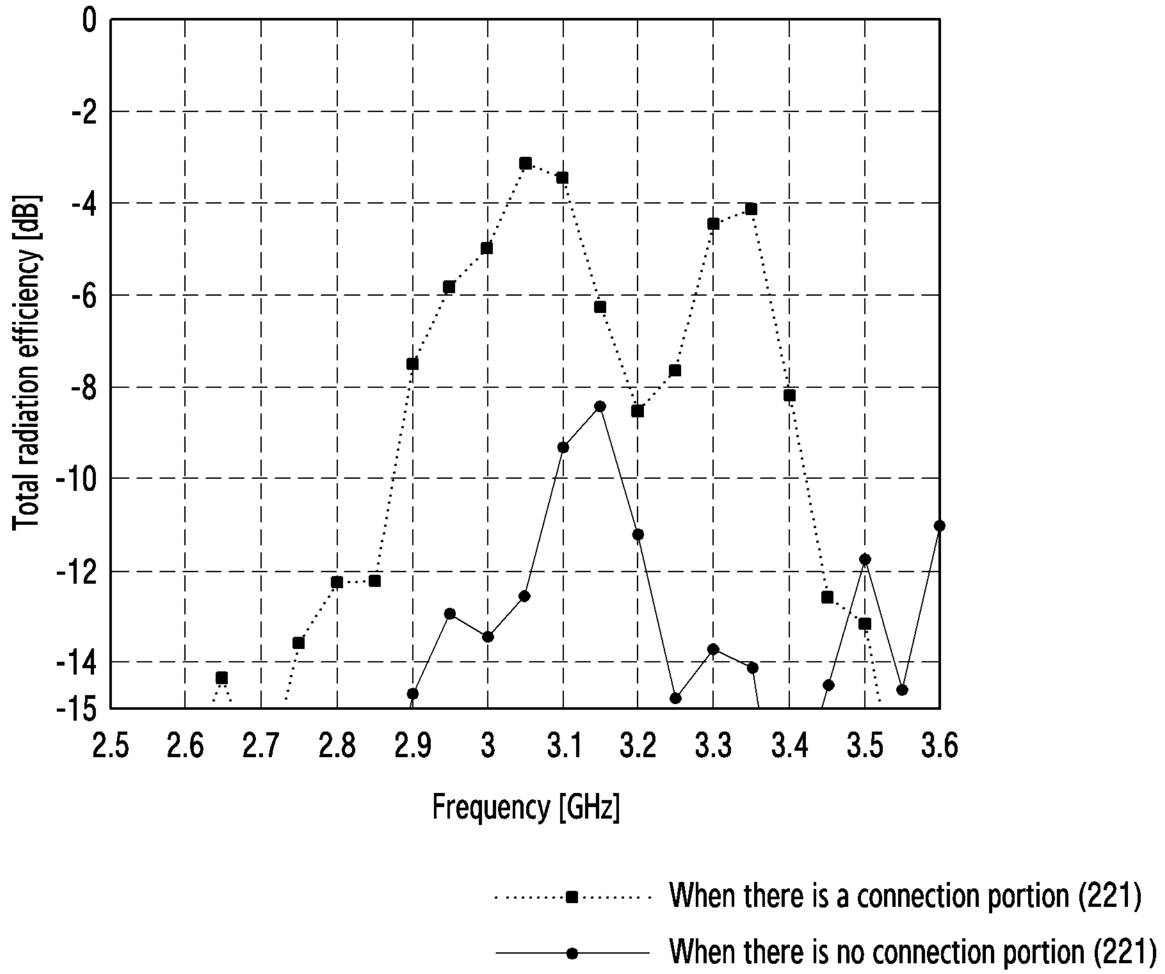
FIG. 8 is a view illustrating a graph of total radiation efficiency of an antenna according to the presence or absence of a connection portion according to an embodiment of the disclosure.

FIG. 8 illustrates a graph of total radiation efficiency of an antenna according to the presence/absence of the connection portion 221 of FIG. 4 according to an embodiment of the disclosure.

Referring to FIG. 8, total radiation efficiency of wireless communication may change when there is the connection portion 221 and when there is no connection portion 221. In an example, the graph illustrated in FIG. 8 may be understood as a graph showing total radiation efficiency according to a resonance path formed in the certain area 300*a* of the mobile communication device 100 according to the presence/absence of the connection portion 221.

According to an embodiment, when the connection portion 221 is formed in the certain area 300*a* of the mobile communication device 100, total radiation efficiency may be high in a frequency band of about 2.9 GHZ to about 3.5 GHZ compared to a case where the connection portion 221 is not formed in the certain area 300*a* of the mobile communication device 100. In an example, the connection portion 221 may be formed in the certain area 300*a* of the mobile communication device 100, such that total antenna radiation efficiency may be enhanced when the first conductive portion 230 and the conductive member 220 are electrically connected.

According to an embodiment, when the connection portion 221 is formed in the certain area 300*a* of the mobile communication device 100, a frequency band in which total radiation efficiency reaches a maximum may be lower than when the connection portion 221 is not formed in the certain area 300*a* of the mobile communication device 100. For example, when the connection portion 221 is formed in the certain area 300*a* of the mobile communication device 100, the total antenna radiation efficiency may reach a maximum value in a frequency band of about 3.05 GHz, and, when the connection portion 221 is not formed in the certain area 300*a* of the mobile communication device 100, the total antenna radiation efficiency may reach a maximum in a frequency band of about 3.15 GHZ.

Figure 9:
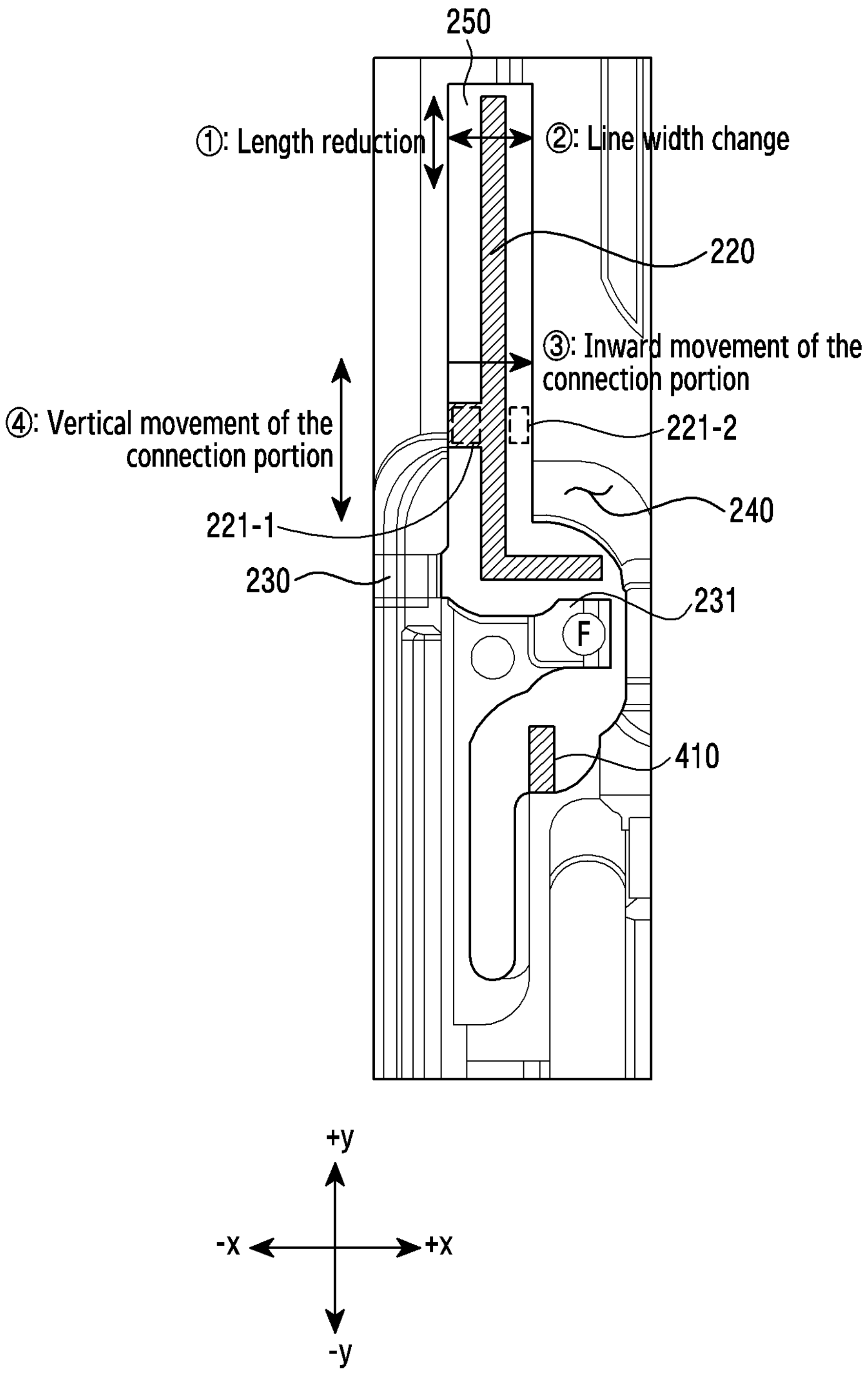
FIG. 9 is a view illustrating conditions which are changeable in a certain area of the mobile communication device according to an embodiment of the disclosure.

FIG. 9 illustrates conditions that are changeable in the certain area 300*a* of the mobile communication device 100 according to an embodiment of the disclosure.

Referring to FIG. 9, at least one of condition ①, condition ②, condition ③, or condition ④ may be changed for at least a part of the first conductive portion 230, the second conductive portion 240, the conductive member 220 in the certain area 300*a* of the mobile communication device 100. For example, condition ① may be a condition where a length of at least part of the conductive member 220 in a first direction (for example, a y-axis direction of FIG. 9) is changed, condition ② may be a condition where a length of the slot 250 in a second direction (for example, a x-axis direction of FIG. 9) is changed, condition ③ may be a condition where the position of the connection portion 221 is moved from a first position 221-1 to a second position 221-2, and condition ④ may be a condition where the position of the connection portion 221 is moved in the first direction (for example, the y-axis direction of FIG. 9).

Figure 10:
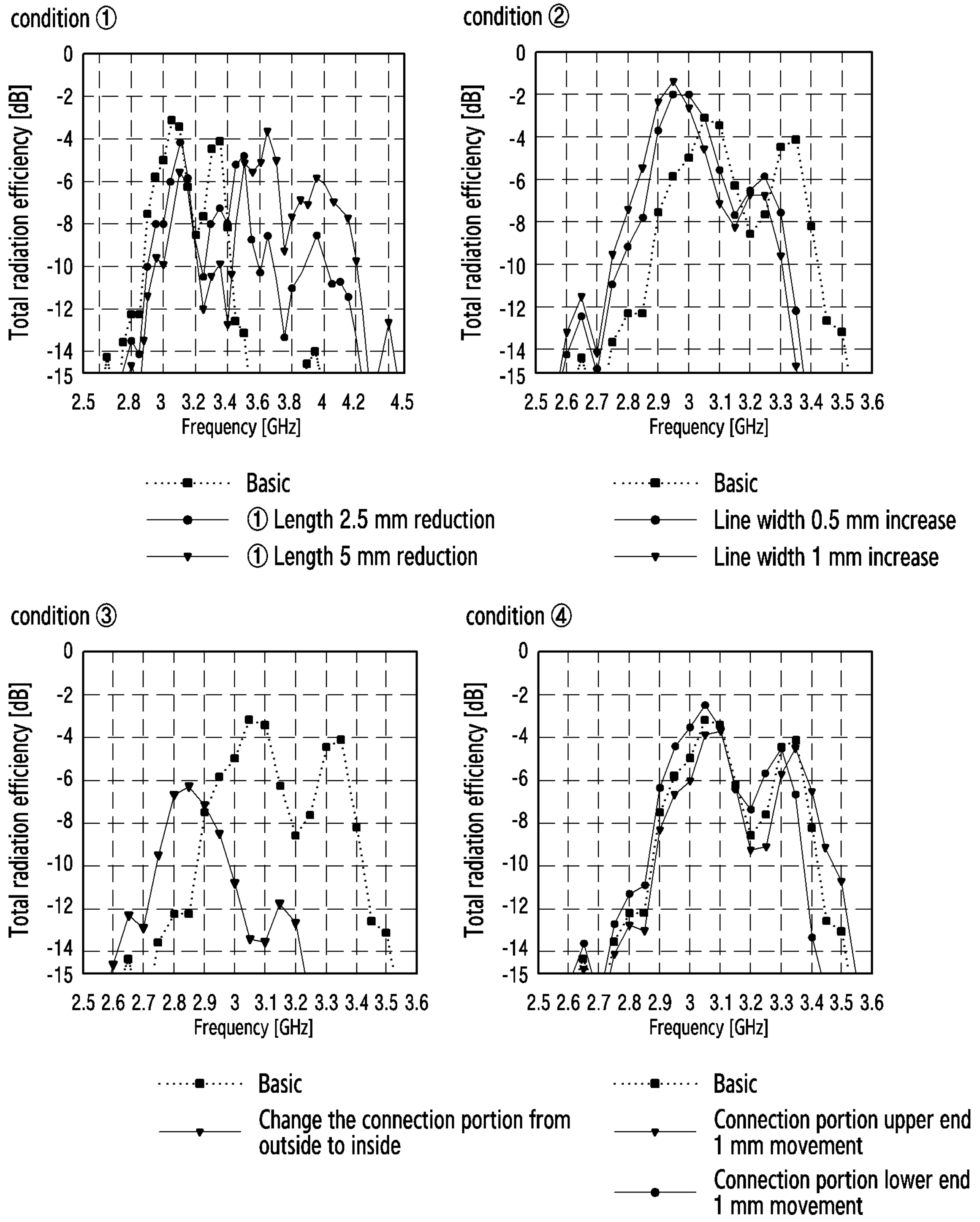
FIG. 10 is a view illustrating graphs of total antenna radiation efficiency when each condition is changed according to an embodiment of FIG. 9 according to an embodiment of the disclosure.

FIG. 10 illustrates graphs showing total antenna radiation efficiency when each condition (condition ①, condition ②, condition ③, or condition ④ is changed according to an embodiment of FIG. 9 according to an embodiment of the disclosure.

Referring to FIG. 10, total radiation efficiency of wireless communication achieved by the certain area 300*a* of the mobile communication device 100 may be changed as condition ①, condition ②, condition ③, or condition ④ is changed.

According to an embodiment, when condition ① is changed, for example, when a length of at least part of the conductive member 220 in the first direction (for example, the y-axis direction of FIG. 9) is changed, a resonance frequency may be moved. In an example, when a length of at least part of the conductive member 220 in the first direction (for example, the y-axis direction of FIG. 9) is reduced, a frequency band in which total radiation efficiency achieved by a resonance path formed in the certain area 300*a* of the mobile communication device 100 reaches a maximum may increase.

According to an embodiment, when condition ② is changed, for example, when a length of the slot 250 in the second direction (for example, the x-axis direction of FIG. 9) is changed, a resonance frequency may be moved. For example, when the length of the slot 250 in the second direction (for example, the x-axis direction of FIG. 9) increases, a frequency band in which total radiation efficiency achieved by a resonance path formed in the certain area 300*a* of the mobile communication device 100 reaches a maximum may be reduced.

According to an embodiment, when condition ③ is changed, for example, when the position of the connection portion 221 is moved from the first position 221-1 to the second position 221-2, a resonance frequency may be reduced. In an example, when the position of the connection portion 221 is moved from the first position 221-1 to the second position 221-2, a frequency band in which total radiation efficiency achieved by a resonance path formed in the certain area 300*a* of the mobile communication device 100 reaches a maximum may be reduced. For example, the position of the connection portion 221 being moved from the first position 221-1 to the second position 221-2 may be electrically connecting the conductive member 220 which has been electrically connected with the first conductive portion 230 with the second conductive portion 240.

According to an embodiment, when condition ④ is changed, for example, when the position of the connection portion 221 is moved in the first direction (for example, the y-axis direction of FIG. 9), a resonance frequency may hardly be changed. In an example, when the position of the connection portion 221 is moved in the +y axis direction or the −y axis direction, total radiation efficiency achieved by a resonance path formed in the certain area 300*a* of the mobile communication device 100 may reach a maximum similarly in a frequency band of about 3 GHz to about 3.1 GHZ.

Figure 11:
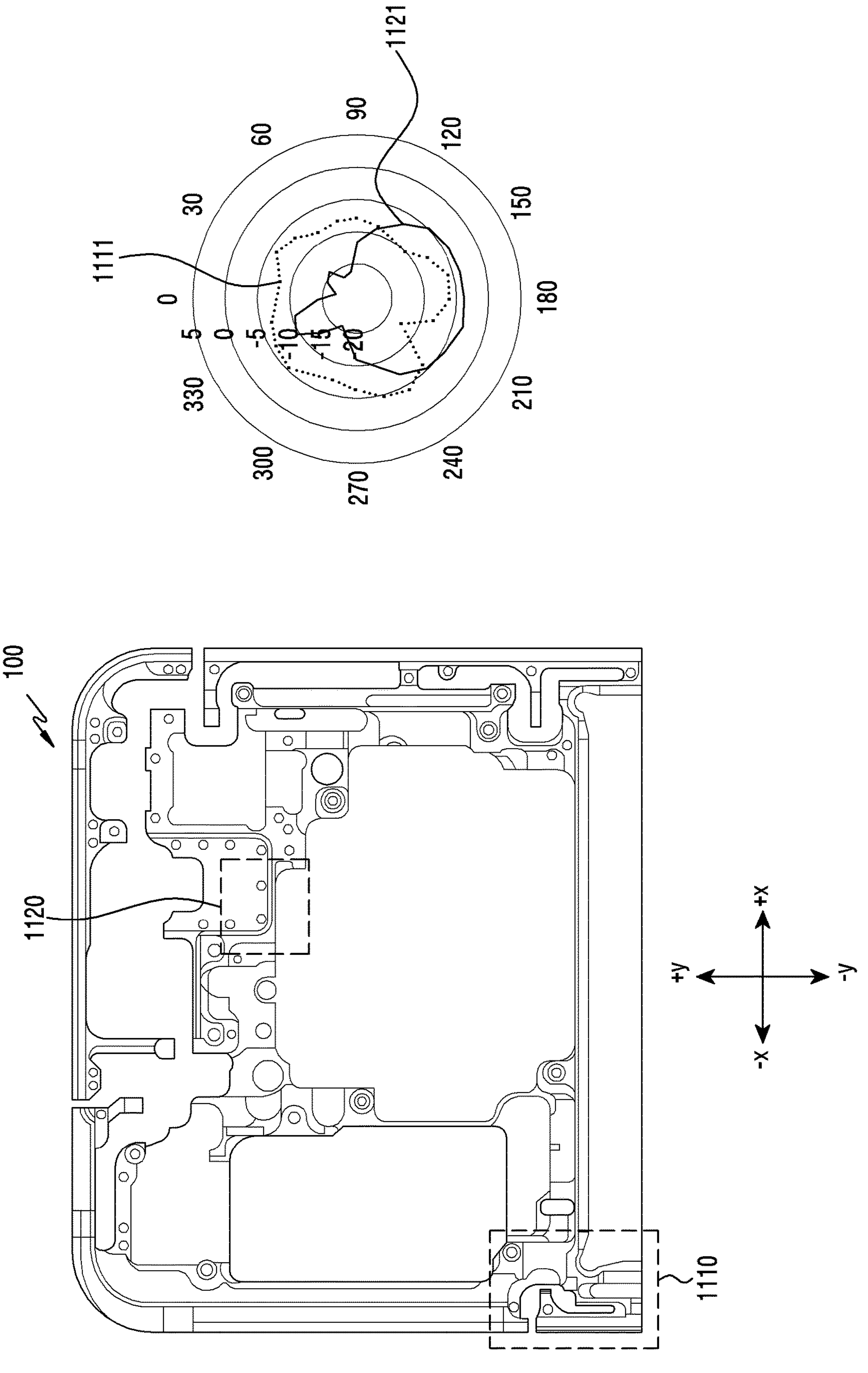
FIG. 11 is a view illustrating an antenna radiation pattern according to a first area and a second area according to an embodiment of the disclosure.

FIG. 11 illustrates an antenna radiation pattern according to a first area 1110 and a second area 1120 according to an embodiment of the disclosure.

Referring to FIG. 11, the first area 1110 may be understood as the same area as the certain area 300*a* of the mobile communication device 100 shown in FIG. 4, and the second area 1120 may be understood as a certain area where a laser direct structuring (LDS) antenna is disposed. In an example, an antenna radiation pattern that is caused by a resonance path formed in the first area 1110 may be a first radiation pattern 1111, and an antenna radiation pattern that is caused by a resonance path formed in the second area 1120 may be a second radiation pattern 1121.

According to an embodiment, the first radiation pattern 1111 may enhance radiation performance in a direction from 0 degree to 90 degrees (for example, the first quadrant on the xy plane of FIG. 11), and in a direction from 270 degrees to 360 degrees (for example, the fourth quadrant on the xy plane of FIG. 11), compared to the second radiation pattern 1121. In an example, antenna radiation caused by a resonance path formed in the first area 1110 may enhance directivity in all directions.

Figure 12:
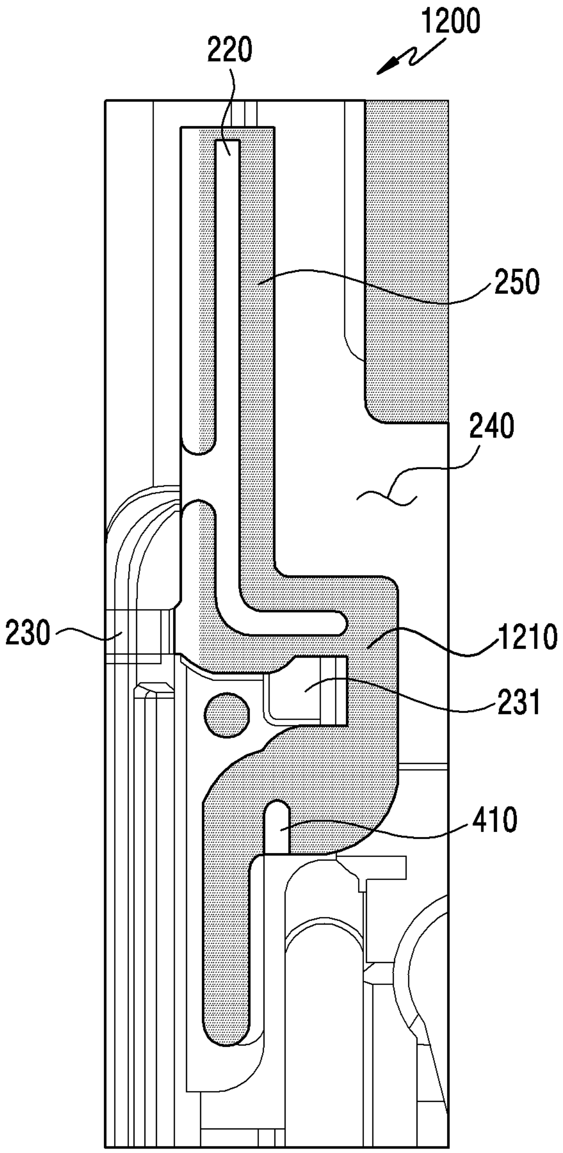
FIG. 12 is a view illustrating a certain area of the mobile communication device for forming a conductive material according to an embodiment of the disclosure.

FIG. 12 illustrates a certain area 1200 of the mobile communication device 100 for forming the conductive member 220 according to an embodiment of the disclosure.

Referring to FIG. 12, the conductive member 220 and a slot 1210 may be formed in the certain area 1200 of the mobile communication device 100.

According to an embodiment, the slot 1210 may be formed by processing the periphery of the conductive member 220 except for the conductive member 220 with the certain area 1200 of the mobile communication device 100 being filled with a conductive material.

According to an embodiment, when the conductive material is removed from the certain area 1200 of the mobile communication device 100, the certain area 300*a* of the mobile communication device 100 may be formed.

Figure 13:
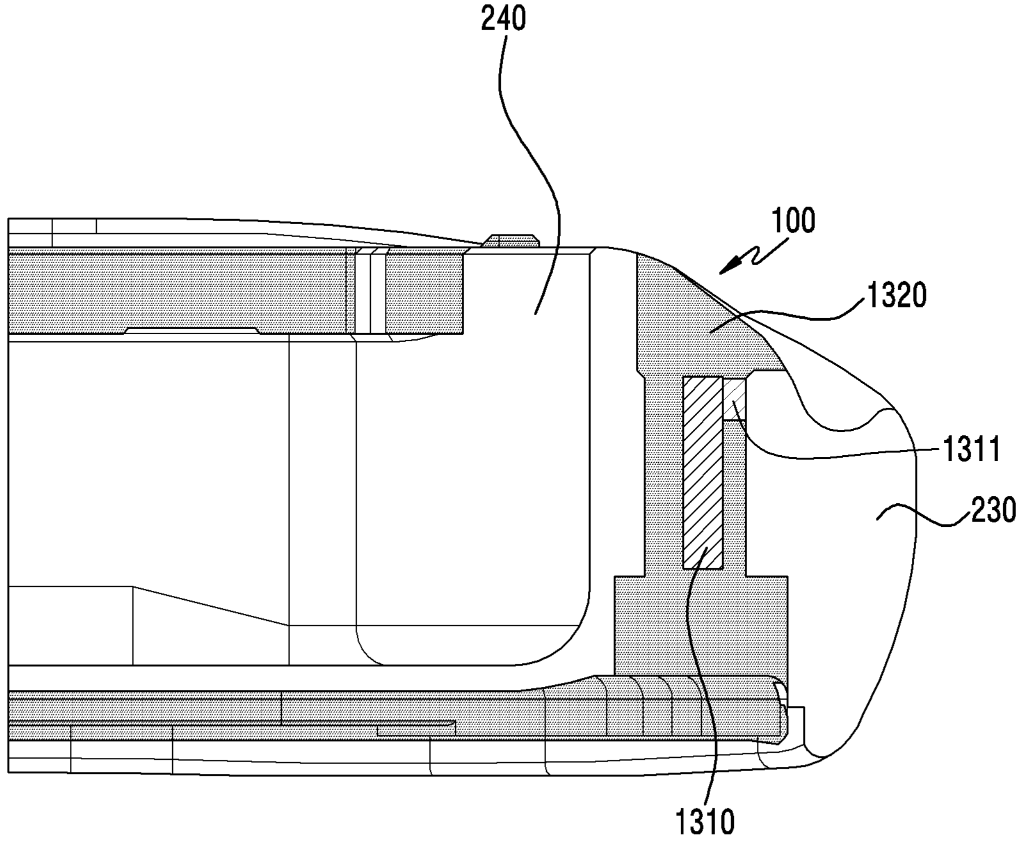
FIG. 13 is a view illustrating a side surface of the mobile communication device according to an embodiment of the disclosure.

FIG. 13 illustrates a side surface of the mobile communication device 100 according to an embodiment of the disclosure. FIG. 13 may be understood as a cross section taken on line A-A' of FIG. 4.

Referring to FIG. 13, the mobile communication device 100 may include a first conductive portion 230, a second conductive portion 240, a conductive member 1310, and/or an opening 1320. In an example, the conductive member 1310 and the opening 1320 may be understood as being substantially the same as the conductive member 220 and the slot 250 illustrated in FIG. 4, respectively.

According to an embodiment, the conductive member 1310 may be formed between the first conductive portion 230 and the second conductive portion 240, and the opening 1320 may be formed on the periphery of the conductive member 1310 to enclose the conductive member 1310. In an example, the opening 1320 may be filled with a dielectric having a designated permittivity.

According to an embodiment, the conductive member 1310 may be spaced apart from the first conductive portion 230 and the second conductive portion 240 by designated distances. In an example, the conductive member 1310 may not be in contact with the first conductive portion 230 and the second conductive portion 240 due to the opening 1320.

According to an embodiment, the conductive member 1310 may have a connection portion 1311. In an example, the connection portion 1311 included in the conductive member 1310 may be understood as being substantially the same as the connection portion 221 illustrated in FIG. 4. In an example, the connection portion 1311 included in the conductive member 1310 may be in contact with the first conductive portion 230, and accordingly, one end of the conductive member 1310 may be in contact with the first conductive portion 230.

Figure 14A:
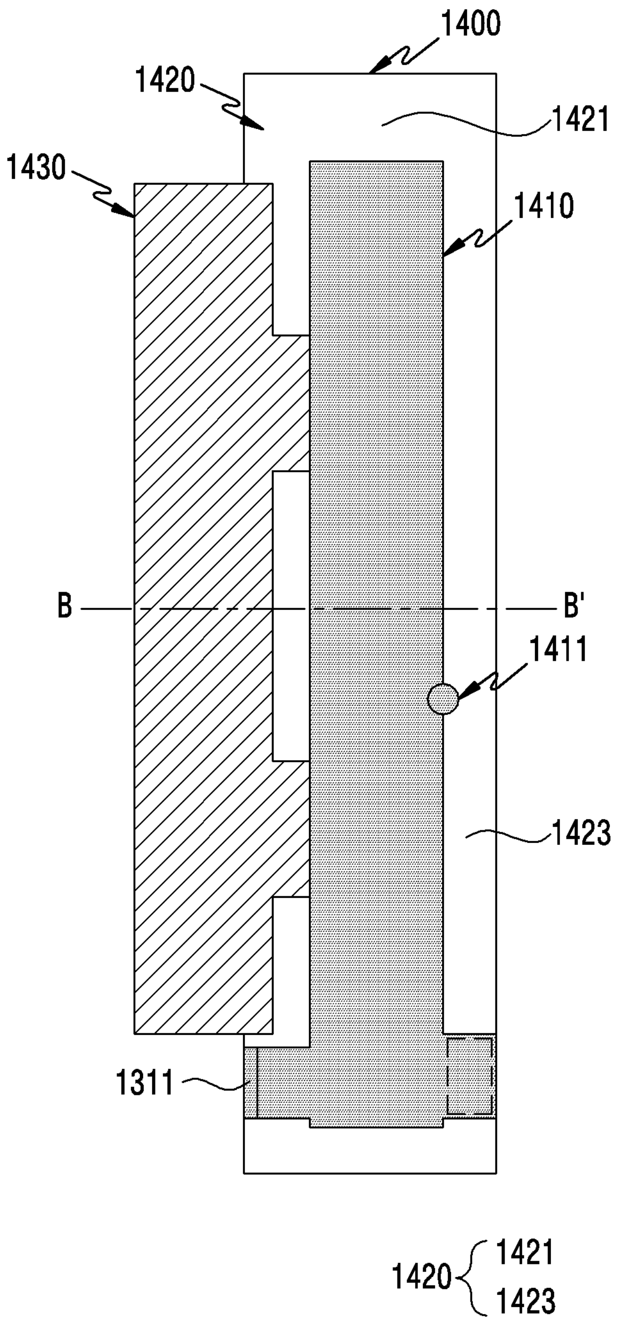
FIG. 14A is a view illustrating one surface of the mobile communication device according to an embodiment of the disclosure.
Figure 14B:
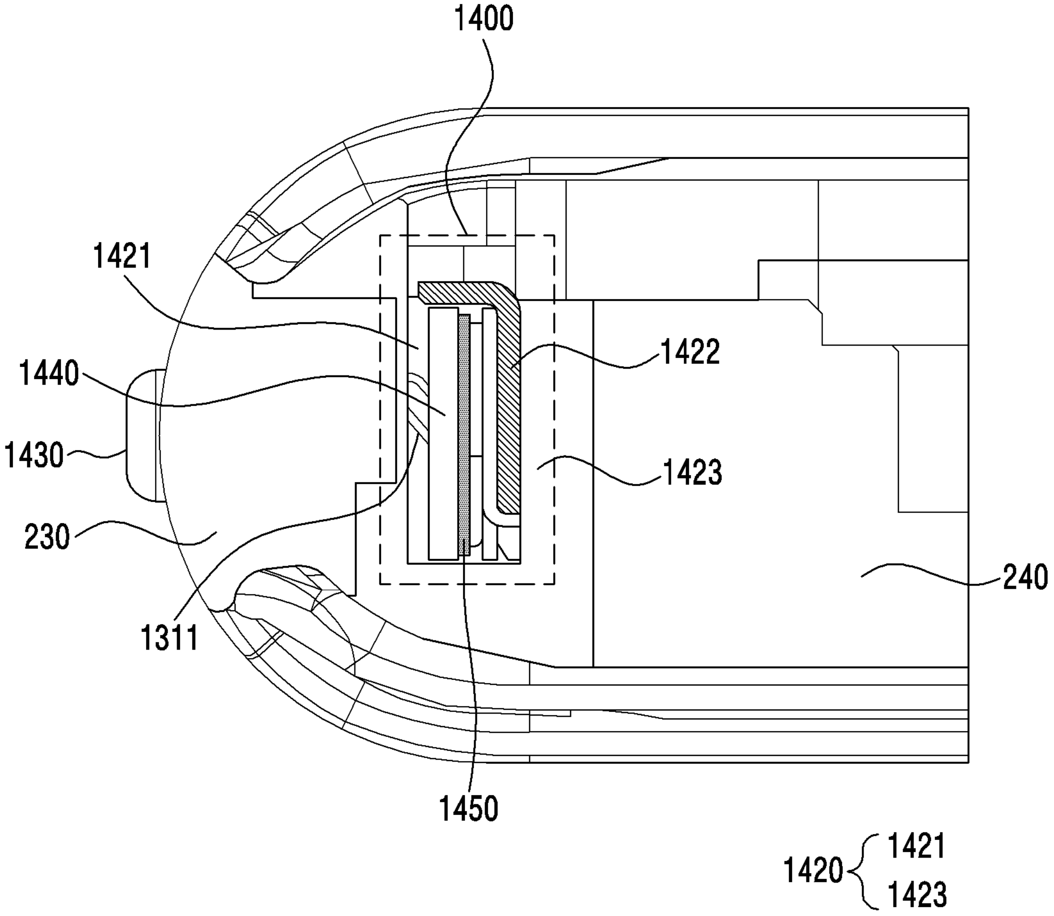
FIG. 14B is a view illustrating a side surface of the mobile communication device according to an embodiment of the disclosure.
Figure 14C:
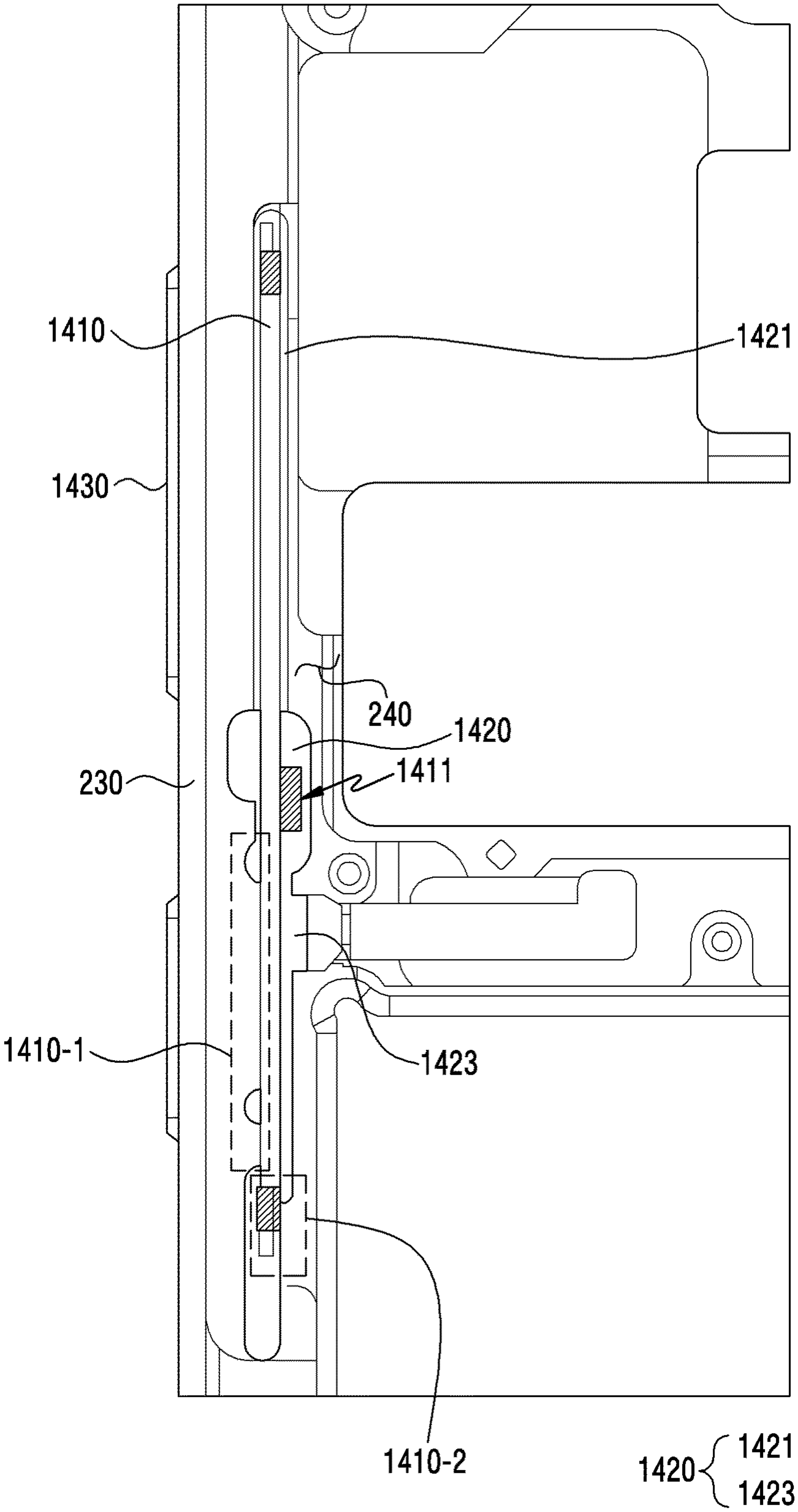
FIG. 14C is a view illustrating one surface of the mobile communication device according to an embodiment of the disclosure.

FIG. 14A illustrates one surface of the mobile communication device 100 according to an embodiment of the disclosure. FIG. 14B illustrates a side surface of the mobile communication device 100 according to an embodiment of the disclosure. FIG. 14C illustrates one surface of the mobile communication device 100 according to an embodiment of the disclosure. In an example, FIG. 14B may be understood as a cross section taken on line B-B' of FIG. 14A.

Referring to FIG. 14A, a key structure 1410 and a slot (or opening) 1420 may be disposed in a certain area 1400 of the mobile communication device 100. In an example, the slot 1420 may include a first slot 1421 or a second slot 1423.

Referring to FIG. 14B, a PCB fixing member 1422, a key structure PCB 1440, a connection portion 1311, a slot 1420, or an adhesive member 1450 may be disposed in the certain area 1400 of the mobile communication device 100. In an example, the key structure PCB 1440, the adhesive member 1450, the PCB fixing member 1422 may form the key structure 1410 of FIG. 14A.

Referring to FIG. 14C, the key structure 1410 may be electrically connected with the first conductive portion 230 and/or the second conductive portion 240. According to an embodiment, the slot 1420 may be formed on the periphery of the key structure 1410 to enclose the key structure PCB 1440. In an example, the slot 1420 may be filled with a dielectric having a designated permittivity.

According to an embodiment, the key structure 1410 may be disposed between the first conductive portion 230 and the second conductive portion 240. In an example, a ground area or a conductive portion of the key structure PCB 1440 included in the key structure 1410 may be disposed instead of the conductive member 1310 of FIG. 13.

According to an embodiment, at least part of the key structure 1410 may be connected with the connection portion 1311. In an example, one end of the key structure 1410 may be integrally formed with the connection portion 1311. A position where the connection portion 1311 is disposed may be understood as corresponding to the first position 221-1 of FIG. 9. According to an embodiment, a feeding point 1411 may be formed in at least part of the key structure 1410.

According to an embodiment, the key structure 1410 may include the key structure PCB 1440, the adhesive member 1450, the PCB fixing member 1422. In an example, the key structure 1410 may be inserted into the slot 1420 with the key structure PCB 1440, the adhesive member 1450, and the PCB fixing member 1422 being integrally coupled.

According to an embodiment, the key structure 1410 may be electrically coupled with the first conductive portion 230 in a first area 1410-1. In an example, the key structure PCB 1440 may be spaced apart from the first conductive portion 230 by a designated distance in the first area 1410-1, and power may be fed to the feeding point 1411, such that the first conductive portion 230 may feed power to the key structure PCB 1440.

According to an embodiment, the slot 1420 which forms a slot area among the key structure 1410, the first conductive portion 230, and the second conductive portion 240 may operate as a slot antenna. In an example, the key structure 1410 and the first conductive portion 230 may be connected and grounded in the first area 1410-1, and the key structure 1410 and the second conductive portion 240 may be connected and grounded in a second area 1410-2, such that a U-shaped slot having an elongated electrical length may be formed. According to an embodiment, the key structure PCB 1440 may be electrically connected with at least part of the second conductive portion 240 in the second area 1410-2.

In an example, the key structure PCB 1440 may be spaced apart from at least part of the second conductive portion 240 by a designated distance in the second area 1410-2, and power may be fed to the feeding point 1411, such that the key structure PCB 1440 may feed power to the second conductive portion 240.

According to an embodiment, a conductive portion included in the key structure 1410 may be connected with the connection portion 311 through a conductive connection member (for example, a C clip) disposed on the key structure PCB 1440, and accordingly, the conductive portion of the key structure 1410 may be electrically connected with the first conductive portion 230. In an example, a portion where the conductive portion of the key structure 1410 is electrically connected with the first conductive portion 230 may be formed in the first area 1410-1.

According to an embodiment, when power is fed to a certain point of the second slot 1423 through the first point 1411, a resonance is formed in a slot that is formed by a gap of the first slot 1421 and a gap of the second slot 1423, such that at least part of the first slot 1421 or the second slot 1423 operates as a slot antenna. In an example, a long slot portion of the slot 1420 may refer to the first slot 1421, and a short slot portion of the slot 1420 may refer to the second slot 1423.

According to an embodiment, the key structure PCB 1440 inserted into the slot 1420 may be electrically connected with a ground area of the key structure 1410 in the first area 1410-1, the second area 1410-2, thereby being grounded.

According to an embodiment, when a key press structure 1430 is pressed, a pressure is applied to the second slot 1423 through a penetrating hole formed in the first conductive portion 230, such that the key structure 1410 may identify that the key press structure 1430 is pressed.

Figure 15:
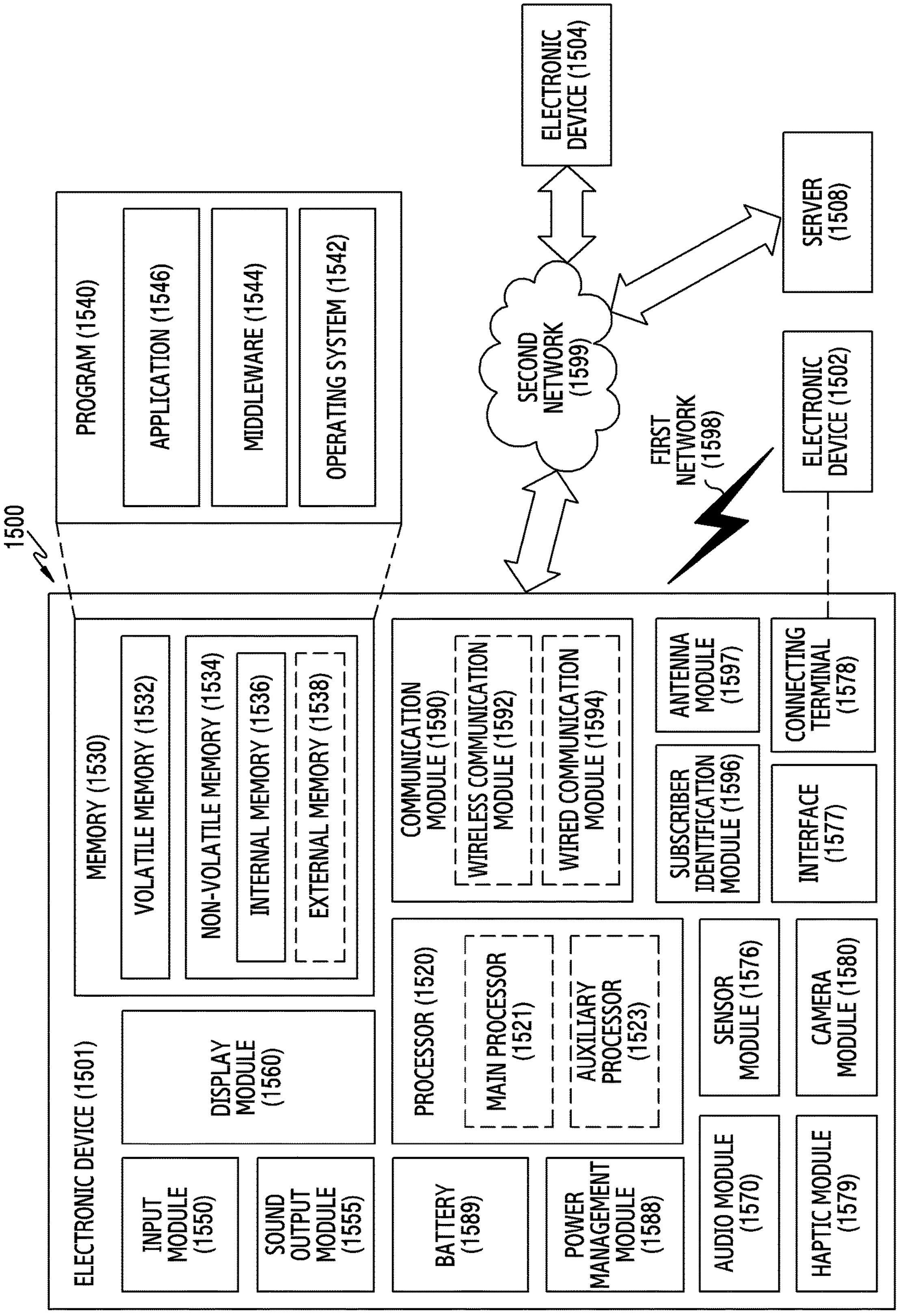
FIG. 15 is a block diagram illustrating a mobile communication device in a network environment according to an embodiment of the disclosure.

FIG. 15 is a block diagram of an electronic device 1501 in a network environment 1500 according to an embodiment of the disclosure.

Referring to FIG. 15, the electronic device 1501 (for example, the mobile communication device 100 of FIGS. 1A and 1B) in the network environment 1500 may communicate with a mobile communication device 1502 via a first network 1598 (e.g., a short-range wireless communication network), or may communicate with a mobile communication device 1504 or a server 1508 via a second network 1599 (e.g., a long-range wireless communication network). According to an embodiment, the electronic device 1501 may communicate with the mobile communication device 1504 via the server 1508. According to an embodiment, the electronic device 1501 may include a processor 1520, a memory 1530, an input module 1550, a sound output module 1555, a display module 1560, an audio module 1570, a sensor module 1576, an interface 1577, a connection terminal 1578, a haptic module 1579, a camera module 1580, a power management module 1588, a battery 1589, a communication module 1590, a subscriber identification module 1596, or an antenna module 1597. In a certain embodiment, at least one (e.g., the connection terminal 1578) of the components may be omitted from the electronic device 1501, or one or more other components may be added in the electronic device 1501. In a certain embodiment, some of the components (for example, the sensor module 1576, the camera module 1580, or the antenna module 1597) may be integrated into one component (for example, the display module 1560).

The processor 1520 may execute, for example, software (e.g., a program 1540) to control at least one other component (e.g., a hardware or software component) of the electronic device 1501 coupled with the processor 1520, and may perform various data processing or computation. According to an embodiment, as at least part of the data processing or computation, the processor 1520 may store a command or data received from another component (e.g., the sensor module 1576 or the communication module 1590) in a volatile memory 1532, may process a command or data stored in the volatile memory 1532, and may store resulting data in a non-volatile memory 1534. According to an embodiment, the processor 1520 may include a main processor 1521 (e.g., a central processing device or an application processor), or an auxiliary processor 1523 (e.g., a graphics processing device, a neural processing unit (NPU), an image signal processor, a sensor hub processor, or a communication processor) that is operable independently from, or in conjunction with, the main processor 1521. For example, when the electronic device 1501 includes the main processor 1521 and the auxiliary processor 1523, the auxiliary processor 1523 may be set to consume lower power than the main processor 1521, or to be specific to a designated function. The auxiliary processor 1523 may be implemented as separate from, or as part of the main processor 1521.

The auxiliary processor 1523 may control at least part of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of other components (e.g., the camera module 1580 or the communication module 1590) functionally related thereto. According to an embodiment, the auxiliary processor 1523 (e.g., a neural processing unit) may include a hardware structure that is specific to processing of an artificial intelligence (AI) model. The AI model may be created through machine learning. Such learning may be performed in the electronic device 1501 itself, which performs AI, or may be performed through a separate server (for example, the server 1508). A learning algorithm may include, for example, supervised learning, unsupervised learning, semi-supervised learning, or reinforcement learning, but is not limited to the above-described example. The AI model may include a plurality of AI neural network layers. The AI neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network or one of combinations of two or more of the aforementioned neural networks, but is not limited to the above-described examples. The AI model may include a software structure additionally or alternatively, in addition to the hardware structure.

The memory 1530 may store various data used by at least one component (e.g., the processor 1520 or the sensor module 1576) of the electronic device 1501. The data may include, for example, software (e.g., the program 1540) and input data or output data regarding a command related thererto. The memory 1530 may include the volatile memory 1532 or the non-volatile memory 1534.

The program 1540 may be stored in the memory 1530 as software, and may include, for example, an operating system 1542, middleware 1544, or an application 1546.

The input module 1550 may receive a command or data to be used by a component (e.g., the processor 1520) of the electronic device 1501, from the outside (e.g., a user) of the electronic device 1501. The input module 1550 may include, for example, a microphone, a mouse, a keyboard, a key (for example, a button) or a digital pen (for example, a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used to receive an incoming call. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and a control circuitry to control a corresponding device. According to an embodiment, the display module 1560 may include a touch sensor set to detect a touch, or a pressure sensor set to measure the intensity of force generated by a touch.

The audio module 1570 may convert a sound into an electrical signal or, reversely, may convert an electrical signal into a sound. According to an embodiment, the audio module 1570 may obtain a sound via the input module 1550, or may output a sound via the sound output module 1555 or an external mobile communication device (e.g., the electronic device 1502) (e.g., a speaker or a headphone) directly or wirelessly coupled with the electronic device 1501.

The sensor module 1576 may detect an operational state (e.g., power or temperature) of the electronic device 1501 or an environmental state (e.g., a state of a user) external to the electronic device, and may generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support at least one specified protocol to be used for the electronic device 1501 to be coupled with an external mobile communication device (e.g., the mobile communication device 1502) directly or wirelessly. According to an embodiment, the interface 1577 may include, for example, a high definition multimedia interface (HDMI), a universal serial bus (USB) interface, a secure digital (SD) card interface, or an audio interface.

The connection terminal 1578 may include a connector via which the electronic device 1501 may be physically connected with an external mobile communication device (e.g., the mobile communication device 1502). According to an embodiment, the connection terminal 1578 may include, for example, an HDMI connector, a USB connector, an SD card connector, or an audio connector (e.g., a headphone connector).

The haptic module 1579 may convert an electrical signal into a mechanical stimulus (e.g., a vibration or a movement) or electrical stimulus which may be perceived by a user via tactile sensation or kinesthetic sensation of the user. According to an embodiment, the haptic module 1579 may include, for example, a motor, a piezoelectric element, or an electric stimulator.

The camera module 1580 may shoot a still image or a moving image. According to an embodiment, the camera module 1580 may include one or more lenses, image sensors, image signal processors, or flashes.

The power management module 1588 may manage power supplied to the electronic device 1101. According to an embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishment of a direct (e.g., wired) communication channel or a wireless communication channel between the electronic device 1501 and an external mobile communication device (e.g., the mobile communication device 1502, the mobile communication device 1504, or the server 1508), and performance of communication via the established communication channel. The communication module 1590 may include at least one communication processor that is operable independently from the processor 1520 (e.g., an application processor) and supports direct (e.g., wired) communication or wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication module). A corresponding communication module of these communication modules may communicate with the external mobile communication device 1504 via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a fifth generation (5G) network, a next-generation communication network, the Internet, or a computer network (e.g., LAN or wide area network (WAN)). These various types of communication modules may be integrated into a single component (e.g., a single chip), or may be implemented as a plurality of components (e.g., a plurality of chips) separate from one another. The wireless communication module 1592 may identify or authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network beyond a fourth generation (4G) network, and a next-generation communication technology, for example, a new radio (NR) access technology. The NR access technology may support high-speed transmission of high-capacity data (enhanced mobile broadband (eMBB)), terminal power minimization and access by multiple terminals (massive machine type communications (mMTC)), or high-reliability and low-latency (ultra-reliable and low latency communications (URLLC)). For example, the wireless communication module 1592 may support a high frequency band (for example, millimeter wave (mmWave) band) to achieve a high data transmission rate. The wireless communication module 1592 may support various technologies for guaranteeing performance in a high frequency band, for example, beamforming, massive multiple-input and multiple-output (MIMO), full dimensional MIMO (FD-MIMO), array antenna, analog beamforming, or large scale antenna. The wireless communication module 1592 may support various requirements prescribed for the electronic device 1501, an external electronic device (for example, the electronic device 1504), or a network system (for example, the second network 1599). According to an embodiment, the wireless communication module 1592 may support a peak data rate (for example, 20 gigabits per second (Gbps) or more) for implementing eMBB, a loss coverage (for example, 164 dB or less) for implementing mMTC, or U-plane latency (for example, downlink (DL) and uplink (UL) of 0.5 milliseconds (ms) or less, or round trip of 1 ms or less) for implementing URLLC.

The antenna module 1597 may transmit or receive a signal or power to or from the outside (e.g., an external mobile communication device). According to an embodiment, the antenna module 1597 may include an antenna including a radiator which is formed of a conductor or a conductive pattern formed on a substrate (for example, a PCB). According to an embodiment, the antenna module 197 may include a plurality of antennas (for example, an array antenna). In this case, at least one antenna appropriate for a communication scheme used in a communication network, such as the first network 1598 or the second network 1599, may be selected from the plurality of antennas by the communication module 1590. A signal or power may be transmitted or received between the communication module 1590 and an external mobile communication device via the selected at least one antenna. According to a certain embodiment, in addition to the radiator, other components (for example, a radio frequency integrated circuit (RFIC)) may be additionally formed as part of the antenna module 1597.

According to various embodiments, the antenna module 1597 may form an mmWave antenna module. According to an embodiment, the mmWave antenna module may include a printed circuit board, an RFIC which is disposed on a first surface (for example, a lower surface) of the printed circuit board or adjacent thereto, and supports a designated high frequency band (for example, mmWave band), and a plurality of antennas (for example, an array antenna) which are disposed on a second surface (for example, an upper surface or a side surface) of the printed circuit board or adjacent thereto, and transmit or receive a signal of the designated high frequency band.

At least some of the above-described components may be coupled to one another and may exchange signals (e.g., commands or data) with one another through an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external mobile communication device 1504 via the server 1508 coupled to the second network 1599. The external mobile communication device 1502 or 1504 may be a device of a same type as, or a different type, from the electronic device 1501. According to an embodiment, all or some of operations to be executed at the electronic device 1501 may be executed in one or more external electronic devices of the external mobile communication devices 1502, 1504, or 1508. For example, if the electronic device 1501 should perform a function or a service automatically, or in response to a request from a user or another device, the electronic device 1501, instead of or in addition to executing the function or the service by itself, may request one or more external mobile communication devices to perform at least part of the function or the service. The one or more external mobile communication devices receiving the request may perform at least part of the function or the service requested, or an additional function or an additional service related to the request, and may transfer an outcome of the performing to the electronic device 1501. The electronic device 1501 may provide the outcome, with or without further processing of the outcome, as at least part of a reply to the request. To achieve this, cloud computing, distributed computing, mobile edge computing (MEC), or client-server computing technology may be used, for example. The electronic device 1501 may provide an ultra-low latency service by using distributed computing or mobile edge computing, for example. In another embodiment, the external mobile communication device 1504 may include an Internet of things (IOT) device. The server 1508 may be an intelligent server that uses machine learning and/or a neural network. According to an embodiment, the external mobile communication device 1504 or the server 1508 may be included in the second network 1599. The electronic device 1501 may be applied to an intelligent service (for example, smart home, smart city, smart car, or health care) based on a 5G communication technology and an IoT-related technology.

According to an embodiment, a mobile communication device 100 may include: a housing 110 which includes a first periphery 310 of the mobile communication device 100 which is extended along a first direction, and a second periphery 320 which is extended from one end of the first periphery 310 in a second direction which is perpendicular to the first direction; a wireless communication circuit 210 which is disposed in the housing 110; and a conductive member 220 which forms a part of the housing 110 or is disposed inside the housing, wherein the housing 110 includes a first conductive portion 230 which forms a part of the first periphery 310 and has a designated length, and a second conductive portion 240 which forms an inner frame of the mobile communication device 100, wherein the first conductive portion 230 includes: a protrusion 231 extended from a first point 310-1 of the first periphery 310; a first portion **230*a* extended from the first point 310-1 by a first length along the first direction; and a second portion 230*b* extended from the first point 310-1 by a second length which is longer than the first length in the opposite direction of the first direction, wherein at least part of the second conductive portion 240 is spaced apart from the first conductive portion 230 in the second direction and is formed in parallel with the first conductive portion, and includes an indentation 241 which is formed to correspond to the protrusion 231 of the first conductive portion 230, wherein the conductive member 220 is disposed among the second portion 230*b* of the first conductive portion 230, the second conductive portion 240, and the protrusion 231, wherein the wireless communication circuit 210 feeds power to the protrusion 231 to transmit and receive a wireless signal through at least part of the first conductive portion 230, the second conductive portion 240, or the conductive member 220**.

According to an embodiment, the conductive member may be a first conductive member, and a second conductive member may be extended from a point of the indentation toward the protrusion and may be formed in parallel with the first portion of the first conductive portion.

According to an embodiment, the first conductive portion may have a length of a first range, and the length of the first range may be a length of a range from 20 mm to 21 mm.

According to an embodiment, the conductive member may include a connection portion, and the connection portion may be in contact with the first conductive portion.

According to an embodiment, the conductive member may include a connection portion, and the connection portion may be in contact with at least part of the second conductive portion.

According to an embodiment, the wireless communication circuit may transmit and receive a wireless signal in a frequency band of 3.6 GHZ.

According to an embodiment, the wireless communication circuit may transmit and receive a wireless signal in a frequency band of 6.5 GHZ.

According to an embodiment, the mobile communication device may further include a slot, and the slot may be formed to enclose a periphery of the conductive member.

According to an embodiment, the slot may be formed with a dielectric having a designated permittivity.

According to an embodiment, the first conductive portion may be formed with a conductive material without a segmented portion.

According to an embodiment, the mobile communication device may further include an LDS antenna.

According to an embodiment, the wireless communication circuit may feed power to the protrusion, such that power is fed to the conductive member through coupling.

According to an embodiment, the wireless communication circuit may feed power to the protrusion, such that power is fed to the conductive member through a contact.

According to an embodiment, the mobile communication device may further include a key structure, and the key structure may be disposed between at least part of the first conductive portion and at least part of the second conductive portion.

According to an embodiment, the key structure may be electrically connected with the first conductive portion and the second conductive portion through coupling.

According to an embodiment, an electronic device may include: a housing which includes a first periphery of the electronic device which is extended along a first direction, and a second periphery which is extended from one end of the first periphery in a second direction which is perpendicular to the first direction; a wireless communication circuit which is disposed in the housing; and a conductive member which forms a part of the housing or is disposed inside the housing, wherein the housing includes a first conductive portion which forms a part of the first periphery and has a designated length, and a second conductive portion which forms an inner frame of the electronic device, wherein the first conductive portion includes: a first portion extended from a first point of the first conductive portion by a first length along the first direction; and a second portion extended from the first point by a second length which is longer than the first length in the opposite direction of the first direction, wherein at least part of the second conductive portion is spaced apart from the first conductive portion in the second direction and is formed in parallel with the first conductive portion, wherein the conductive member is disposed between the second portion of the first conductive portion, and the second conductive portion, wherein the wireless communication circuit feeds power to a certain point of the first conductive portion to transmit and receive a wireless signal through at least part of the first conductive portion, the second conductive portion, or the conductive member.

According to an embodiment, the first conductive portion may further include a protrusion which is extended from the first point of the first periphery, and at least part of the second conductive portion may further include an indentation which is formed to correspond to the protrusion of the first conductive portion. The conductive member may be disposed among the second portion of the first conductive portion, the second conductive portion, and the protrusion, and the wireless communication circuit may feed power to a certain point of the protrusion to transmit and receive a wireless signal through at least part of the first conductive portion, the second conductive portion, or the conductive member.

According to an embodiment, the conductive member may be a first conductive member, and a second conductive member may be extended from a point of the indentation toward the protrusion and may be formed in parallel with the first portion of the first conductive portion.

The electronic device may further include a slot, and the slot may be formed to enclose a periphery of the conductive member.

According to an embodiment, the slot may be formed with a dielectric having a designated permittivity.

The mobile communication device according to various embodiments of the disclosure may be various types of devices. The mobile communication device may include, for example, a portable communication device (for example, a smart phone), a computer device, a portable multimedia device, a portable medical device, a camera, a wearable device, or a home appliance. According to an embodiment of the disclosure, the mobile communication device is not limited to the above-described devices.

It should be appreciated that various embodiments of the disclosure and the terms used therein are not intended to limit the technological features set forth herein to particular embodiments, and include various changes, equivalents, or alternatives for a corresponding embodiment. As used herein, each of such phrases as "A or B," "at least one of A and B," "at least one of A or B," "A, B, or C," "at least one of A, B, and C," and "at least one of A, B, or C," may include one or all possible combinations of the items enumerated together in a corresponding one of the phrases. As used herein, such terms as "1st" and "2nd," or "first" and "second" may be used to simply distinguish a corresponding component from another, and does not limit the components in other aspect (for example, importance or order). It is to be understood that if an element (for example, a first element) is referred to, with or without the term "operatively" or "communicatively", as "coupled with," "coupled to", "connected with", or "connected to" another element (for example, a second element), it means that the element may be coupled with another element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure may be implemented as software (for example, the program 1540) including one or more instructions that are stored in a storage medium (for example, internal memory 1536 or external memory 1538) that is readable by a machine (for example, the electronic device 1501). For example, a processor (for example, the processor 1520) of the machine (for example, the electronic device 1501) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (for example, an electromagnetic wave), but this term does not differentiate between a case where data is semi-permanently stored in the storage medium and a case where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (for example, compact disc read only memory (CD-ROM)), or may be distributed (for example, downloaded or uploaded) online via an application store (for example, Play Store™), or between two user devices (for example, smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (for example, a module or a program) of the above-described components may include a single entity or multiple entities, and some of the multiple entities may be separately disposed in other components. According to various embodiments, one or more of the above-described components or operations may be omitted, or one or more other components or operations may be added. Alternatively or additionally, a plurality of components (for example, modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A mobile communication device comprising:
a housing comprising:
a first periphery of the mobile communication device extending along a first direction, and
a second periphery extending from one end of the first periphery in a second direction perpendicular to the first direction;
a wireless communication circuit disposed in the housing; and
a first conductive member forming a part of the housing or disposed inside the housing,
wherein the housing comprises:
a first conductive portion forming a part of the first periphery and having a designated length, and
a second conductive portion forming an inner frame of the mobile communication device,
wherein the first conductive portion comprises:
a protrusion extending from a first point of the first periphery,
a first portion extending from the first point by a first length along the first direction, and
a second portion extending from the first point by a second length longer than the first length in a third direction opposite to the first direction,
wherein at least part of the second conductive portion is spaced apart from the first conductive portion in the second direction, is formed in parallel with the first conductive portion, and includes an indentation formed to correspond to the protrusion of the first conductive portion,
wherein the first conductive member is disposed among the second portion of the first conductive portion, the second conductive portion, and the protrusion,
wherein a second conductive member extends from a point of the indentation toward the protrusion in a direction parallel to the first portion,
wherein the protrusion is positioned between the first conductive member and the second conductive member,
wherein the protrusion is spaced apart from the first conductive member to form a first slot between the first conductive member and the protrusion,
wherein the protrusion is spaced apart from the second conductive member to form a second slot between the second conductive member and the protrusion,
wherein the protrusion is positioned between the first slot and the second slot, and
wherein the wireless communication circuit is configured to feed power to the protrusion to transmit and receive a wireless signal through at least one of the first slot or the second slot.

2. The mobile communication device of claim 1,
wherein the first conductive portion has a length of a first range, and
wherein the length of the first range is between 20 millimeters (mm) to 21 mm.

3. The mobile communication device of claim 1,
wherein the first conductive member includes a connection portion, and
wherein the connection portion contacts the first conductive portion.

4. The mobile communication device of claim 1,
wherein the first conductive member includes a connection portion, and
wherein the connection portion contacts at least part of the second conductive portion.

5. The mobile communication device of claim 1, wherein the wireless communication circuit is further configured to transmit and receive the wireless signal in a frequency band of 3.6 gigahertz (GHz).

6. The mobile communication device of claim 1, wherein the wireless communication circuit is further configured to transmit and receive the wireless signal in a frequency band of 6.5 gigahertz (GHz).

7. The mobile communication device of claim 1, wherein the first slot is formed to enclose a periphery of the first conductive member.

8. The mobile communication device of claim 7, wherein the first slot is formed with a dielectric having a designated permittivity.

9. The mobile communication device of claim 1, wherein the first conductive portion is formed with a conductive material without a segmented portion.

10. The mobile communication device of claim 1, further comprising:

a laser direct structuring (LDS) antenna.

11. The mobile communication device of claim 1, wherein the wireless communication circuit is further configured to feed power to the protrusion, such that power is fed to the first conductive member through coupling.

12. The mobile communication device of claim 1, wherein the wireless communication circuit is further configured to feed power to the protrusion, such that power is fed to the first conductive member through a contact.

13. The mobile communication device of claim 1, further comprising:

a key structure disposed between at least part of the first conductive portion and at least part of the second conductive portion.

14. The mobile communication device of claim 13, wherein the key structure is electrically connected with the first conductive portion and the second conductive portion through coupling.

15. The mobile communication device of claim 1, wherein at least a portion of the second slot is between the second conductive member and the first portion of the first conductive portion.

16. The mobile communication device of claim 1, wherein the first periphery has a third length and the second periphery has a fourth length shorter than the third length.

* * * * *